United States Patent
Ahlers et al.

(10) Patent No.: US 8,452,662 B2
(45) Date of Patent: *May 28, 2013

(54) SYSTEM, PROGRAM PRODUCT, AND ASSOCIATED METHODS TO AUTODRAW FOR MICRO-CREDIT ATTACHED TO PREPAID CARD

(75) Inventors: Rebecca Ahlers, Cincinnati, OH (US); Andrew B. Crowe, Omaha, NE (US); Scott H. Galit, New York, NY (US); Trent Sorbe, Brookings, SD (US)

(73) Assignee: Metabank, Sioux Falls, SD (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/233,465

(22) Filed: Sep. 15, 2011

(65) Prior Publication Data

US 2012/0005094 A1  Jan. 5, 2012

Related U.S. Application Data

(63) Continuation of application No. 12/417,211, filed on Apr. 2, 2009, now Pat. No. 8,069,085.

(60) Provisional application No. 61/042,612, filed on Apr. 4, 2008.

(51) Int. Cl.
- *G06Q 20/00* (2012.01)
- *G06Q 20/10* (2006.01)
- *G06Q 20/20* (2006.01)
- *G06Q 40/00* (2006.01)

(52) U.S. Cl.
CPC .............. *G06Q 20/10* (2013.01); *G06Q 20/102* (2013.01); *G06Q 20/20* (2013.01); *G06Q 40/00* (2013.01)
USPC ................... 705/17; 705/16; 705/35; 705/38; 705/39; 705/40

(58) Field of Classification Search
CPC ....... G06Q 20/204; G06Q 20/20; G06Q 40/10; G06Q 20/102; G06Q 20/10
USPC .............................. 705/16, 17, 35, 38, 39, 40
See application file for complete search history.

(56) References Cited

U.S. PATENT DOCUMENTS

| | | | |
|---|---|---|---|
| 3,752,904 | A | 8/1973 | Waterbury |
| 4,247,759 | A | 1/1981 | Yuris et al. |

(Continued)

FOREIGN PATENT DOCUMENTS

| | | |
|---|---|---|
| EP | 0397512 | 11/1990 |
| EP | 0619565 | 10/1994 |

(Continued)

OTHER PUBLICATIONS

Daniel Wolfe. (Jul. 28, 2005). An E-Variation on Payday Loan Theme. American Banker, p. 1. Retrieved Aug. 9, 2011, from Accounting & Tax Periodicals.*

(Continued)

*Primary Examiner* — Olusegun Goyea
(74) *Attorney, Agent, or Firm* — Bracewell & Giuliani LLP

(57) ABSTRACT

A prepaid card processor receives data for a line of credit for a prepaid card from a lending institution computer. The prepaid card processor makes available draws to the line of credit line on behalf of the lending institution computer in an authorization stream for a proposed purchase using the prepaid card as payment. When the line of credit is accessed, the processor loads the prepaid card with an additional value equal to one or more preselected loan increments so that the prepaid card then has a new amount totaling a previous amount plus the amount of value of the one or more preselected loan increments and so that the new amount exceeds or equals the value of a proposed purchase. Then the processor notifies the lending institution so that the line of credit balances on the lending institution computer and the prepaid card processor are kept in sync.

20 Claims, 12 Drawing Sheets

U.S. PATENT DOCUMENTS

| | | | |
|---|---|---|---|
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamil |
| 4,722,054 A | 1/1988 | Yorozu et al. |
| 4,727,243 A | 2/1988 | Savar |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanara et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,963,921 A | 10/1999 | Longfield |
| 6,000,608 A | 12/1999 | Dorf |
| 6,012,635 A * | 1/2000 | Shimada et al. ............ 235/380 |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziarno |
| 6,304,860 B1 | 10/2001 | Martin et al. |
| 6,315,193 B1 | 11/2001 | Hogan |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |
| 7,258,273 B2 | 8/2007 | Griffin |
| 7,370,076 B2 | 5/2008 | Friedman et al. |
| 7,398,919 B2 | 7/2008 | Cooper |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 * | 1/2010 | Dabney ............ 705/38 |
| 7,702,583 B1 | 4/2010 | Hamilton et al. |
| 7,702,587 B2 | 4/2010 | Nguyen et al. |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 * | 10/2010 | Johnson ............ 705/40 |
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B2 * | 4/2011 | Hotz et al. ............ 705/38 |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,214,286 B1 | 7/2012 | Galit et al. |
| 8,244,611 B2 | 8/2012 | Galit |
| 8,244,637 B2 | 8/2012 | Galit et al. |
| 2001/0021925 A1 | 9/2001 | Ukigawa et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |

| | | |
|---|---|---|
| 2002/0055904 A1 | 5/2002 | Mon |
| 2002/0055909 A1 | 5/2002 | Fung et al. |
| 2002/0077971 A1 | 6/2002 | Allred |
| 2002/0107797 A1 | 8/2002 | Combaluzier |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0004997 A1 | 1/2003 | Parker et al. |
| 2003/0055782 A1 | 3/2003 | Slater |
| 2003/0061170 A1* | 3/2003 | Uzo ............................... 705/64 |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1* | 10/2003 | Lee et al. ......................... 705/2 |
| 2003/0208443 A1* | 11/2003 | Mersky ........................ 705/40 |
| 2003/0217003 A1 | 11/2003 | Weinflash et al. |
| 2004/0036215 A1 | 2/2004 | Butler |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1* | 11/2004 | Johnson ........................ 705/40 |
| 2004/0235542 A1 | 11/2004 | Stronach et al. |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1* | 1/2005 | Stimson et al. ................. 705/1 |
| 2005/0075939 A1* | 4/2005 | Bao et al. ........................ 705/26 |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0203837 A1 | 9/2005 | Leigh et al. |
| 2005/0205663 A1 | 9/2005 | Algiene |
| 2005/0228724 A1* | 10/2005 | Frangiosa ........................ 705/26 |
| 2005/0278188 A1 | 12/2005 | Thomson et al. |
| 2005/0278347 A1 | 12/2005 | Wolf et al. |
| 2005/0283436 A1* | 12/2005 | Greer et al. ................... 705/40 |
| 2005/0289044 A1 | 12/2005 | Breslin et al. |
| 2006/0059085 A1* | 3/2006 | Tucker ........................ 705/38 |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1* | 8/2006 | Oehlerking et al. ............ 705/14 |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0249570 A1 | 11/2006 | Seifert |
| 2006/0259957 A1 | 11/2006 | Tam et al. |
| 2006/0282356 A1* | 12/2006 | Andres et al. ................... 705/35 |
| 2006/0282374 A1* | 12/2006 | Stone ........................... 705/38 |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1* | 3/2007 | LeFebvre ........................ 705/14 |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser et al. |
| 2007/0100746 A1 | 5/2007 | Blair et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1* | 1/2008 | Davis et al. ..................... 705/35 |
| 2008/0021772 A1 | 1/2008 | Aloni et al. |
| 2008/0040261 A1 | 2/2008 | Nix et al. |
| 2008/0040265 A1 | 2/2008 | Rackley et al. |
| 2008/0052189 A1 | 2/2008 | Walker et al. |
| 2008/0052224 A1 | 2/2008 | Parker |
| 2008/0059363 A1* | 3/2008 | Hotz et al. ..................... 705/38 |
| 2008/0065532 A1 | 3/2008 | De La Motte |
| 2008/0091519 A1* | 4/2008 | Foss ................................ 705/10 |
| 2008/0103968 A1 | 5/2008 | Bies et al. |
| 2008/0103970 A1* | 5/2008 | Books et al. ................... 705/39 |
| 2008/0120129 A1 | 5/2008 | Seubert et al. |
| 2008/0140561 A1 | 6/2008 | Neel |
| 2008/0140568 A1* | 6/2008 | Henry ........................... 705/40 |
| 2008/0162271 A1 | 7/2008 | Benjamin |
| 2008/0162337 A1 | 7/2008 | Greenland et al. |
| 2008/0210753 A1 | 9/2008 | Plozay et al. |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers et al. |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0222132 A1 | 9/2010 | Sanford et al. |
| 2010/0280949 A1 | 11/2010 | Van Rensburg |
| 2010/0306104 A1* | 12/2010 | Johnson ........................ 705/40 |
| 2010/0312684 A1 | 12/2010 | Kemper et al. |
| 2011/0047039 A1 | 2/2011 | Crames et al. |
| 2011/0093323 A1 | 4/2011 | Prus et al. |
| 2011/0106698 A1 | 5/2011 | Isaacson et al. |
| 2011/0112957 A1 | 5/2011 | Ingram et al. |
| 2011/0270664 A1 | 11/2011 | Jones |

FOREIGN PATENT DOCUMENTS

| | | |
|---|---|---|
| EP | 0348932 | 5/1995 |
| JP | 2-238593 | 9/1990 |
| JP | 2-278495 | 11/1990 |
| JP | 3-100791 | 4/1991 |
| JP | 4-165588 | 6/1992 |
| KR | 2010010217 | 2/2010 |
| WO | 86/02757 | 5/1986 |
| WO | 86/07647 | 12/1986 |
| WO | 88/03297 | 5/1988 |
| WO | 89/08899 | 9/1989 |
| WO | 91/09370 | 6/1991 |
| WO | 93/09515 | 5/1993 |
| WO | 94/10649 | 5/1994 |
| WO | 94/28498 | 12/1994 |
| WO | 95/03570 | 2/1995 |
| WO | 97/46986 | 12/1997 |
| WO | 00/60487 | 10/2000 |
| WO | 2007/133315 | 11/2007 |
| WO | 2008102329 A2 | 8/2008 |
| ZA | 200709282 | 10/2007 |

OTHER PUBLICATIONS

David Lazarus (Oct. 6, 2004). 120% rate for Well's advance. San Francisco Chronicle, San Francisco, California, p. C1.*

Congressional Budget Office, "Emerging Electronic Method for Making Payments" (Jun. 1996) CBO.

Coady et al., "Targeted anti-povety intervention: A selected annotated bibliography" (Apr. 2002), World Bank.

Notice of Allowance from co-pending U.S. Appl. No. 12/609,896, dated Jan. 3, 2012.

Notice of Allowance from co-pending U.S. Appl. No. 13/233,268, dated Dec. 13, 2011.

Office Action from co-pending U.S. Appl. No. 12/367,187 dated Jan. 6, 2012.

Office Action from co-pending U.S. Appl. No. 12/731,852, dated Dec. 22, 2011.

Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 18, 2011).

Notice of Allowance from co-pending U.S. Appl. No. 12/465,803 dated Dec. 20, 2011.

MasterCard Electronic prepaid (Oct. 2003). The Nilson Report, (798), (Dec. 9, 2011), The Banking Source (Document ID 474833171).

Downes, How to avoid exchange charges Wasting Money a foreign currency bank account could be the answer, The Daily Telegraph, London (UK), Mar. 10, 2007.

Office Action for co-pending U.S. Appl. No. 13/232,405 dated Feb. 2, 2012.

Office Action for co-pending U.S. Appl. No. 12/877,524 dated Feb. 14, 2012.

Notice of Allowance for co-pending U.S. Appl. No. 12/417,182 dated Feb. 14, 2012.

Final Office Action for co-pending U.S. Appl. No. 12/338,497 dated Mar. 1, 2012.

Final Office Action co-pending U.S. Appl. No. 12/465,277 dated Feb. 28, 2012.

Office Action for co-pending U.S. Appl. No. 12/607,780 dated Mar. 19, 2012.

Notice of Allowance for co-pending U.S. Appl. No. 12/465,803 dated Mar. 20, 2012.

Notice of Allowance for co-pending U.S. Appl. No. 12/562,331 dated Mar. 20, 2012.

Ex-parte Quayle Action for co-pending U.S. Appl. No. 12/700,681 dated Mar. 23, 2012.

Final Office Action for co-pending U.S. Appl. No. 12/389,749 dated Mar. 29, 2012.

Final Office Action for co-pending U.S. Appl. No. 12/731,852 dated Apr. 5, 2012.

Final Office Action for co-pending U.S. Appl. No. 12/465,306 dated Apr. 11, 2012.

Notice of Allowance for co-pending U.S. Appl. No. 13/349,423 dated Apr. 13, 2012.

Office Action for co-pending U.S. Appl. No. 12/877,490 dated Apr. 18, 2012.

Office Action for co-pending U.S. Appl. No. 12/892,847 dated Apr. 30, 2012.

Final Office Action for co-pending U.S. Appl. No. 12/338,440 dated Jan. 19, 2012.

Office Action for co-pending U.S. Appl. No. 12/465,306 date Nov. 10, 2011.

Final Office Action for co-pending U.S. Appl. No. 12/338,540 dated Mar. 15, 2012.

Wolf, File History of US 2005/0278347.

Check Cashers Move Into Cards, Accounts (Cover Story), ATM & Debit News [serial online], Apr. 20, 2006, 6(24), pp. 1-3, available from Business Source Complete, Ipswich, MA.

Mangu-Ward, K.; (Oct. 2009), Payday of Reckoning, Reason, 41(5), pp. 40-47, retrieved Jun. 15, 2012, from Research Library (Document ID:1861658171).

Wolf, Alan Steven, What to do when the Chain Breaks, Servicing Management, Feb. 1997, 3 pages.

99Bill Launches Installment Credit Services, (Aug. 21, 2008), PR Newswire, 2 pages, retrieved Jul. 9, 2012, from Business Dateline (Document ID: 1536854041).

Intralinks, Inc. Begins European Rollout of Its Proven Electronic Solution for Loan Syndication, London (Business Wire), Oct. 8, 1997, 3 pages.

Final Office Action for co-pending U.S. Appl. No. 13/232,405 dated May 22, 2012.

Office Action for co-pending U.S. Appl. No. 13/405,051 dated Jun. 6, 2012.

Final Office Action for co-pending U.S. Appl. No. 12/877,524 dated Jun. 8, 2012.

Notice of Allowance for co-pending U.S. Appl. No. 12/700,681 dated Jun. 11, 2012.

Notice of Allowance for co-pending U.S. Appl. No. 13/365,982 dated Jun. 26, 2012.

Office Action for co-pending U.S. Appl. No. 12/554,432 dated Jun. 29, 2012.

Office Action for co-pending U.S. Appl. No. 13/349,290 dated Jul. 3, 2012.

Notice of Allowance for co-pending U.S. Appl. No. 12/338,540 dated Jul. 9, 2012.

Office Action for co-pending U.S. Appl. No. 13/282,186 dated Jul. 13, 2012.

Notice of Allowance for co-pending U.S. Appl. No. 13/330,397 dated Jul. 18, 2012.

Final Office Action for co-pending U.S. Appl. No. 12/367,187 dated Jul. 19, 2012.

Final Office Action for co-pending U.S. Appl. No. 13/232,700 dated Jul. 19, 2012.

Final Office Action for co-pending U.S. Appl. No. 12/626,349 dated Jul. 20, 2012.

Office Action for co-pending U.S. Appl. No. 13/036,076 dated Jul. 24, 2012.

Notice of Allowance for co-pending U.S. Appl. No. 13/481,950 dated Jul. 30, 2012.

Notice of Allowance for co-pending U.S. Appl. No. 13/405,079 dated Aug. 6, 2012.

Notice of Allowance for co-pending U.S. Appl. No. 13/474,519 dated Aug. 27, 2012.

Office Action for co-pending U.S. Appl. No. 12/889,281 dated Aug. 30, 2012.

Notice of Allowance for co-pending U.S. Appl. No. 13/232,405 dated Sep. 4, 2012.

Notice of Allowance for co-pending U.S. Appl. No. 12/338,497 dated Sep. 17, 2012.

Notice of Allowance for co-pending U.S. Appl. No. 12/877,490 dated Sep. 20, 2012.

Jane Boon Pearlstine, "Lenders, Borrowers Hook Up Over the Web: Prosper.com and Other Sites Provide Forum for Individual Bidders Willing to Offer Small Loans", Wall Street Journal, May 20, 2006.

United Nations Conference on Trade and Development, "E-Finance and Small and Medium-Size Enterprises (SMEs) in Developing and Transition Economies", UNCTAD Expert Meeting, Oct. 17, 2001.
Tim Jones, "Paradigms Lost", RSA Journal, Oct. 2006,pp. 28-31.
Diego Rumiany, "Internet Bidding for Microcredit: Making it Work in the Developed World, Conceiving it for the Developing World", Mar. 2007.
Stefan Heng, Thomas Meyer,and Antje Stobbe, "Implications of Web 2.0 for Financial Institutions: Be a Driver, Not a Passenger", Munich Personal RePEc Archive, Jul. 31, 2007.
Matt Flannery, "Kiva and the Birth of Person to Person Microfinance", Innovations, pp. 31-58, Winter & Spring 2007.
Michael K. Hulme and Collette Wright, "Internet Based Social Lending: Past, Present and Future", Social Futures Observatory, Oct. 2006.
Richard. W. Coleman, "Is the Future of the Microfinance Movement to be Found on the Internet?", International Trade and Finance Association Working Papers, 2007.
Amanda Scott and Patrick Towell, "The Web We Weave", Financial World, pp. 12-15, Nov. 2006.
Prosper, "Access and Transparency through Person-to-Person Lending," FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/554,659, filed Sep. 4, 2009, titled "System,Method, and Program Product for Foreign Currency Travel Account".
Co-pending U.S. Appl. No. 12/554,432, filed Sep. 4, 2009, titled "System, Program Product and Methods for Retail Activation and Reload Associated With Partial Authorization Transactions".
Cross, Sam Y., All About . . . The Foreign Exchange Market in the United States, 1998, Federal Reserve Bank of new York.
Wolfe, Daniel, "An E-Variation on Payday Loan Theme", American Banker, Jul. 28, 2005.
Financial Advice Investment Money Oct. 1, 2009 at 5:50pm. HSBC Offshore Internet Banking (Notice of Allowance in co-pending U.S. Appl. No. 12/554,659 by Examiner).
Financial Advice Investment Money Oct. 1, 2009 at 7:52 am. HSBC Offshore Internet Banking (Notice of Allowance in co-pending U.S. Appl. No. 12/554,659 by Examiner).
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
"Developing Asia and the World", Asian Development Bank 2002.
Microtrax Ltd., PC Electronic Payment Systems Reference Manual; 1995 (381 pages).
Caskey, John P. et al., "Is the Debit Card Revolution Finally Here", Federal Reserve Bank of Kansas City, Economic Review: Fourth Quarter 1994; pp. 70-95, vol. 79, #4 (17 pages).
Castaneda, Laura, "Business Promote Services to Customers Day In and Day Out", The Dallas Morning News, Nov. 26, 1994 (3 pages).
Mannix, Margaret, "Checkout Tech", U.S. News and World Report, Feb. 27, 1995, (6 pages).
"Credit Terminals to be Used at Canadian Liquor Outlets", Card News, Jan. 23,1995, (1 page).
"Debit Card Popularity on the Rise," Chain Store Age Executive, Jan. 1994, (1 page).
"Debit Goes to Dinner", Credit Card Management, New York, Oct. 1994 (2 pages).
Peppard, Alan, "Down and Dirty in Deep Ellum," The Dallas Morning News, Dec. 3, 1994 (2 pages).
Everest Reference Manual, VeriFone Part No. 25399, Revision A, Manual Revision 1.0, Jul. 1995, (66 pages).
"Express Cards and Trains", Chain Store Age Executive Edition, Jan. 1995, (1 page).
Brown, Suzanne, "Goodnight Amy, Meg, Beth and Jo", Rocky Mountain News, Dec. 8, 1994 (1 page).
Klein, Robert J., "Here Comes the Debit Card", D& B Reports, Jul./Aug. 1990 (2 pages).
Hypercom S7C Advertisement, Chain Store Age, Sep. 1995 (4 pages).
Hypersom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment Systems for Supermarket Application User's Guide, Sep. 1996 (222 pages).
Fox, Linda A., "Keep an Eye on Your Credit Card," The Toronto Sun, Aug. 9,1996 (1 page).
Pyatt, Rudolph A., Jr., "Mobil Stations to Permit Use of Bank Cards", The Washington Post (1 page).
NCR 4430-5000 MSR/PIN User's Guide, 1994 (265 pages).
Co-pending U.S. Appl. No. 12/417,211, filed Apr. 2, 2009, titled "System, Program Product, and Associated Methods to Autodraw for Micro-Credit Attached to Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Prepaid Cards and Lines of Credit Based on Expected Tax Refund Proceeds, Associated Systems and Computer Program Products".
Co-pending U.S. Appl. No. 12/417,162, filed Apr. 2, 2009, titled System, Program Product, and Method for Debit Card and Checking Account Autodraw.
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,277, filed May 13, 2009, titled "System, Program Product, and Computer- implemented Method for Loading a Loan on a Pre-Paid Card".
Co-pending U.S. Appl. No. 12/465,306, filed May 13, 2009, titled "System, Program Product, and Computer- Implemented Methods for Loading a Loan on an Existing Pre-Paid Card".
Co-pending U.S. Appl. No. 12/465,803, filed May 13, 2009, titled "System, Program Product, and Method for Loading a Loan on a Pre-Paid Card".
Co-pending U.S. Appl. No. 12/607,780, filed Oct. 28, 2009, titled "Shopping Center Gift Card Offer Fulfillment Machine, Program Product, and Associated Methods".

Co-pending U.S. Appl. No. 12/609,896, filed Oct. 30, 2009, titled "Machine Methods, and Program Product for Electronic Order Entry".
Co-pending U.S. Appl. No. 12/626,349, filed Nov. 25, 2009, titled "Machine, Methods, and Program Product for Electronic Inventory Tracking".
Co-pending U.S. 13/232,405, filed Sep. 14, 2011, titled "System, Method, and Program Product for Foreign Currency Travel Account".
Co-pending U.S. Appl. No. 13/233,268, filed Sep. 15, 2011, titled "System, Program Product, and Associated Methods to Autodraw for Micro-Credit Attached to Prepaid Card".
Co-pending U.S. Appl. No. 13/214,126, filed Aug. 19, 2011, titled "Person-to-Person Lending Program Product, System, and Associated Computer-Implemented Methods".
Nieman Marcus: High-Tech for the Holidays, ADWEEK, Dec. 5, 1994 (1 page).
Neiman Marcus Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
"One Company's Diversification Shakes Up Peripherals Market", Chain Store Age, Jun. 1996 (3 pages).
O'Keefe, Michael, "Portable POS Terminal Mean Greater Convenience", Bank Systems & Technology, Nov. 1994 (2 pages).
"POS Terminal Can Handle Direct Debits", ABA Banking Journal, Sep. 1984 (2 pages).
Racel Corp, Advertisement, POS Terminal Eliminates Credit Card Vouchers, ABA Banking Journal, Nov. 1985 (2 pages).
Szabo, Joan C., "The Changing World of Financial Services", Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
Barnes, David B., VeriFone Introduces Everest (TM) Customer Activated Payment System to Multi-Lane Retail Market, OR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, VeriFone Part No. 00483-Revision D, Manual Revision 3.01, Apr. 1990 (144 pages).
Microtrax, Ltd. Omni 490 M (and 490ML) Operation Manual for Integrated and Non-Integrated Configurations, 1994 (60 pages).
Microtrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (280 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park, NC, Jun. 1991 (429 pages).
Krino, Gray, et al., "A Birthday Card That Pays Off", The Orange County Register, Jul. 19, 1996 (2 pages).
Cohen, Bruce, "Alternative to Cash Gains Ground", The Financial Post, Apr. 22, 1994 (2 pages).
Bank of Boulder POS Debit Solution at the Table Now in Beta: First Bank to Certify IVI Spirit C2000 on MAPP (R), Business Wire, Aug. 3, 1994 (1 page).

Co-pending U.S. Appl. No. 12/562,331, filed Sep. 18, 2009, titled "Computerized Extension of Credit to Existing Demand Deposit Accounts, Prepaid Cards and Lines of Credit Based on Expected Tax Refund Proceeds, Associated Systems and Computer Program Products".
Co-pending U.S. Appl. No. 12/700,681, filed Feb. 4, 2010, titled System and Computer Program Product to Issue a Retail Prepaid Card including a User-Designed External Face Using a Chit and Related Computer Implemented Methods.
Co-pending U.S. Appl. No. 12/814,405, filed Jun. 11, 2010, titled Environmental-Friendly Fuel Credit Card System, Program Product, and Computer-Implemented Methods.
Co-pending U.S. Appl. No. 12/877,490, filed Sep. 8, 2010, titled "System, Program Product, and Method for Debit Card and Checking Account Autodraw".
Co-pending U.S. Appl. No. 12/877,524, filed Sep. 8, 2010, titled System, Program Product, and Method for Debit Card and Checking Account Autodraw.
Co-pending U.S. Appl. No. 12/889,281, filed Sep. 23, 2010, titled "Computer-Implemented Methods, Computer Program Products, and Systems for Enhanced Loan Product Repayments".
Co-pending U.S. Appl. No. 12/892,847, filed Sep. 28, 2010, titled "Computer-Implemented Methods, Computer Program Products, and Systems for Management and Control of a Loyalty Rewards Network".
Co-pending U.S. Appl. No. 12/731,852, filed Mar. 25, 2010, titled "Machine, Program Product, and Computer Implemented Methods for Confirming a Mobile Banking Request".
Co-pending U.S. Appl. No. 13/036,076, filed Feb. 28, 2011, titled "Machine, Program Product, and Computer—Implemented Method to Construct a Person-To-Person Loan".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/397,113, filed Mar. 3, 2009, titled "Person-To-Person Lending Program Products, System, and Associated Computer—Implemented Methods".
Co-pending U.S. Appl. No. 12/338,365, filed Dec. 18, 2008, titled "Transfer Account Systems, Computer Program Products, and Associated Computer-Implemented Methods".
"Letter of Credit Explained: What is Lettter of Credit?", Dec. 26, 2005, pp. 1-2.
VIPGift Received Investment from Summit Partners and Bridgescale Partners, Nov. 11, 2008, Chattanooga, TN and Palo Alto, CA.
Bank Deals-Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
Office action from co-pending U.S. Appl. No. 12/338,497 dated Aug. 18, 2011.
Notice of Allowance for co-pending U.S. Appl. No. 12/417,199 dated Aug. 18, 2011.
Notice of Allowance for co-pending U.S. Appl. No. 12/417,211 dated Aug. 22, 2011.
Notice of Allowance for co-pending U.S. Appl. No. 12/554,669 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Office Action in co-pending U.S. Appl. No. 12/367,187 dated Jun. 27, 2011.
Office Action in co-pending U.S. Appl. No. 12/609,896 dated Apr. 5, 2011.
Office Action in co-pending U.S. Appl. No. 12/417,162 dated Apr. 13, 2011.
Office Action in co-pending U.S. Appl. No. 12/338,684 dated Mar. 4, 2011.

Office Action in co-pending U.S. Appl. No. 12/417,199 dated Mar. 17, 2011.
Office Action in co-pending U.S. Appl. No. 12/465,803 dated Mar. 17, 2011.
Office Action in co-pending U.S. Appl. No. 12/338,584 dated Mar. 22, 2011.
Office Action in co-pending U.S. Appl. No. 12/417,211 dated Mar. 29, 2011.
Office Action in co-pending U.S. Appl. No. 12/407,320 dated Mar. 29, 2011.
Office Action in co-pending U.S. Appl. No. 12/338,402 dated Feb. 18, 2011.
Office Action in co-pending U.S. Appl. No. 12/338,402 dated Sep. 28, 2010.
Office Action in co-pending U.S. Appl. No. 12/417,162 dated Sep. 3, 2010.
International Search Report for PCT/US09/56072 dated Oct. 20, 2009.
International Search Report for PCT/US09/39504 dated May 27, 2009.
International Search Report for PCT/US09/39512 dated Jun. 8, 2009.
International Search Report for PCT/US09/43978 dated Jun. 30, 2009.
International Search Report for PCT/US09/43988 dated Jul. 14, 2009.
International Search Report for PCT/US09/39492 dated May 14, 2009
International Search Report for PCT/US09/39495 dated May 18, 2009.
International Search Report for PCT/US08/87689 dated Jun. 17, 2009.
Office Action in co-pending U.S. Appl. No. 12/338,365 dated Jul. 9, 2010.
Office Action in co-pending U.S. Appl. No. 12/338,645 dated Jul. 9, 2010.
Office Action in co-pending U.S. Appl. No. 12/338,645 dated Jul. 19, 2010.
Office Action in co-pending U.S. Appl. No. 12/338,365 dated Jan. 26, 2011.
Office Action in co-pending U.S. Appl. No. 12/417,162 dated Jan. 19, 2011.
Office Action in co-pending U.S. Appl. No. 12/389,749 dated Feb. 1, 2011.
Office Action in co-pending U.S. Appl. No. 12/338,540 dated Sep. 1, 2011.
International Search Report for PCT/US09/34692 dated Apr. 14, 2009.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Office Action co-pending U.S. Appl. No. 12/626,349, dated Nov. 22, 2011.
Notice of Allowance for co-pending U.S. Appl. No. 12/417,162 dated Oct. 1, 2012.
Office Action for co-pending U.S. Appl. No. 13/214,126 dated Oct. 4, 2012.
Notice of Allowance for co-pending U.S. Appl. No. 12/607,780 dated Oct. 9, 2012.
Final Office Action for co-pending U.S. Appl. No. 13/232,700 dated Oct. 12, 2012.
Office Action for co-pending U.S. Appl. No. 13/284,524 dated Oct. 15, 2012.
Notice of Allowance for co-pending U.S. Appl. No. 13/601,724 dated Oct. 18, 2012.
Office Action for co-pending U.S. Appl. No. 13/536,765 dated Nov. 30, 2012.
Notice of Allowance for co-pending U.S. Appl. No. 13/282,186 dated Dec. 17, 2012.

* cited by examiner

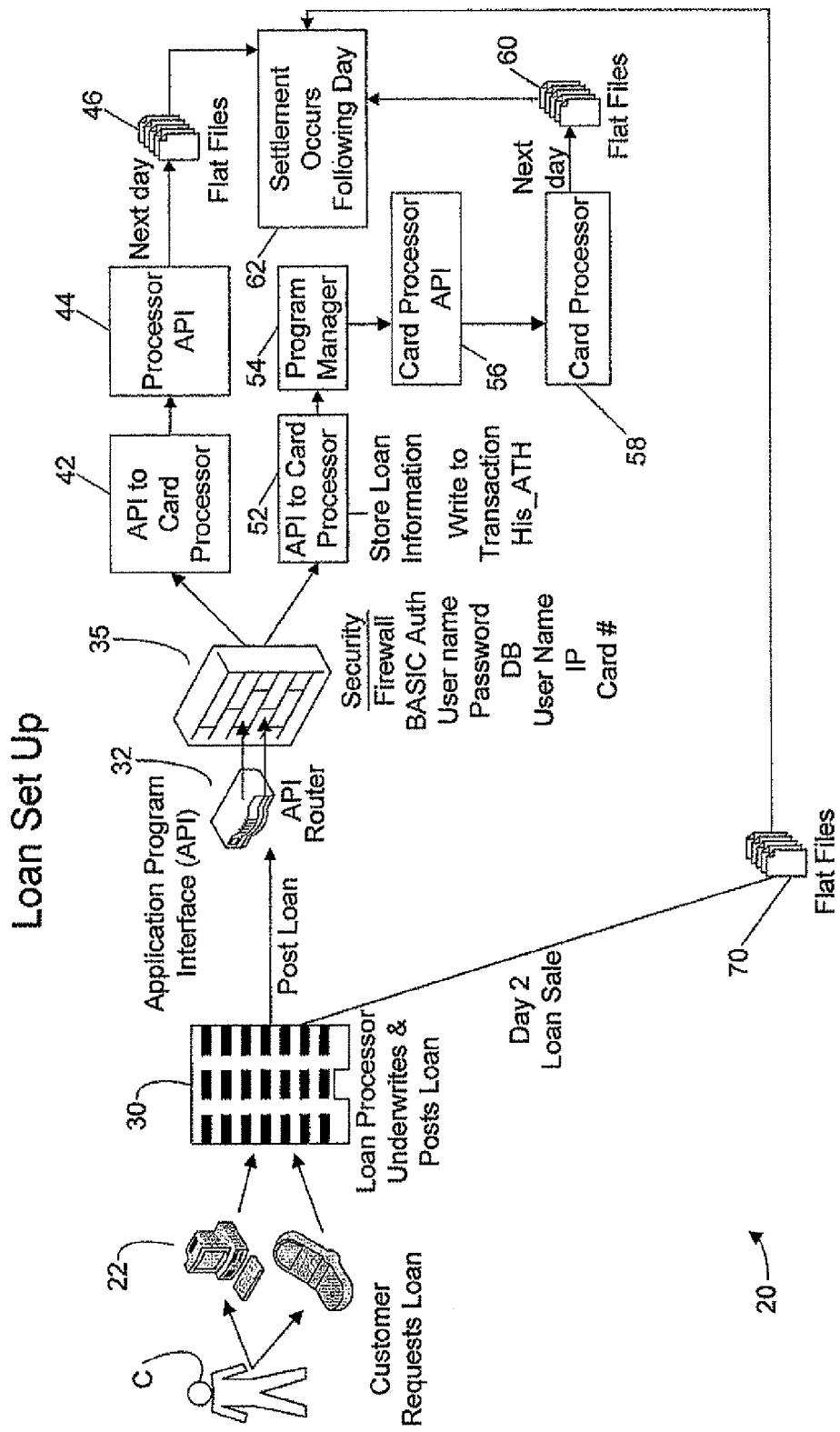

| Browser Tool Bar |
|---|
| Create New Account |
| Complete the fields below to set up Customer Line of Credit ("LOC") account. Click on the CONTINUE button for next screen. The CANCEL button returns you to the Log-In page without saving any changes. |

Required fields are marked *

LOC Account Details

Create User ID ☐

Create Password ☐

Confirm Password ☐

Verification Information

Prepaid Card Number ☐

Last 4 Digits of Your SSN ☐

Year of Birth ☐

E-mail Account Details (*optional*)

E-mail Address ☐

Confirm E-Mail Address ☐

Computer Screen Interface Menu

FIGURE 11

WWW.XXXXXX.COM

ACCOUNT ACTIVITY STATEMENT

PREPAID CARD ACCOUNT XXXX XXXX XXXX XXXX

| DATE | DESCRIPTION | CREDIT | DEBIT | CARD BAL. | LOC AVAIL. | LOC BAL. |
|---|---|---|---|---|---|---|
| 1/1/2009 | CARD BALANCE | | | $21 | $60 | $0 |
| 1/2/2009 | LOC ADVANCE & FEE (Fee = 2 X $2.50 PER $20 INCREMENT) | $40 | | $61 | $15 | $45 |
| 1/2/2009 | GOODS PURCHASE | | $42 | $19 | $15 | $45 |
| 1/15/2009 | PAYCHECKCO. | $750 | | $769 | $15 | $45 |
| 1/15/2009 | LOC REPAYMENT | | $45 | $724 | $60 | $0 |
| 1/16/2009 | LINE OF CREDIT INCREASE | | | $724 | $90 | |

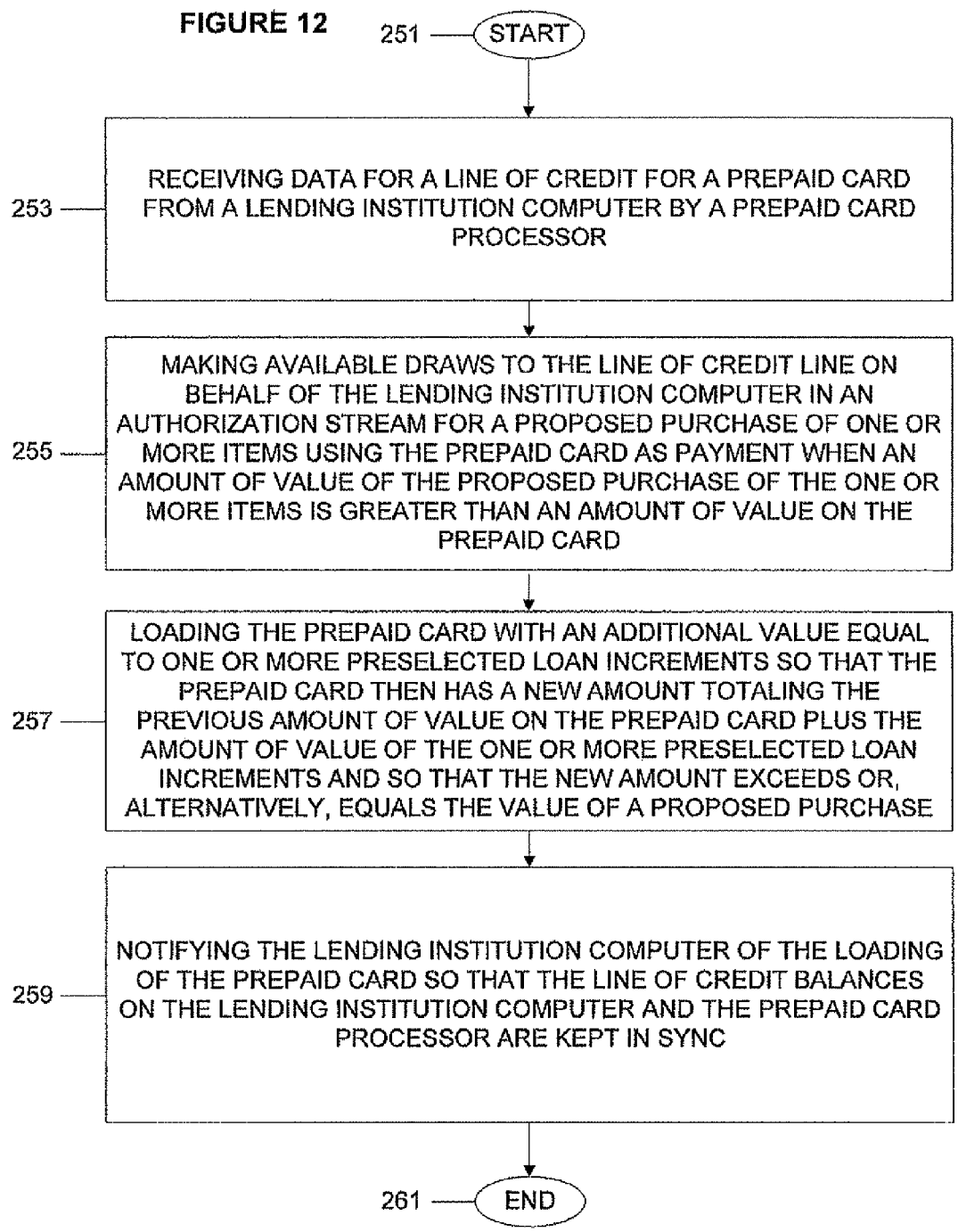

SYSTEM, PROGRAM PRODUCT, AND ASSOCIATED METHODS TO AUTODRAW FOR MICRO-CREDIT ATTACHED TO PREPAID CARD

RELATED APPLICATIONS

This application is a continuation of and claims priority and the benefit to U.S. patent application Ser. No. 12/417,211, by Ahlers et al., titled "System, Program Product, and Associated Methods to Autodraw for Micro-Credit Attached to a Prepaid Card" filed on Apr. 2, 2009, which claims benefit and priority to U.S. Provisional Patent Application Ser. No. 61/042,612, by Ahlers et al., titled "System, Program Product, and Associated Methods to Autodraw for Micro-Credit Attached to a Prepaid Card" filed on Apr. 4, 2008, each incorporated herein by reference in its entirety. This application also relates to: U.S. Provisional Patent Application Ser. No. 61/016,213, by Sorbe et al., titled "Transfer Account Systems, Computer Program Products, and Associated Methods" filed on Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,624, by Crowe et al., titled "System, Program Product, and Method to Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to: U.S. patent application Ser. No. 12/338,365, by Sorbe et al., titled "Transfer Account Systems, Computer Program Products, and Associated Computer-Implemented Methods" filed on Dec. 18, 2008; U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/389,749, by Sorbe et al., titled "Methods to Advance Loan Proceeds on Prepaid Cards, Associated Systems and Computer Program Products" filed on Feb. 20, 2009; PCT/US09/34692, by Sorbe et al., titled "Methods to Advance Loan Proceeds on Prepaid Cards, Associated Systems and Computer Program Products" filed on Feb. 20, 2009; U.S. patent application Ser. No. 12/417,211, by Ahlers et al., titled "System, Program Product, and Associated Methods to Autodraw for Micro-Credit Attached to a Prepaid Card" filed on Apr. 2, 2009; U.S. patent application Ser. No. 12/417,182, by Crowe et al., titled "System, Program Product, and Method to Authorize Draw for Retailer Optimization" filed on the Apr. 2, 2009; U.S. patent application Ser. No. 12/338,684, by Ahlers et al., titled "Computer-Implemented Methods, Program Product, and System for Micro-Loan Management" filed on Dec. 18, 2008; PCT/US08/87660 by Ahlers et al., titled "Computer-Implemented Methods, Program Product, and System for Micro-Loan Management" filed on Dec. 19, 2008; U.S. patent application Ser. No. 12/338,712, by Galit et al., titled "Computer-Implemented Methods, Program Product, and System to Enhance Banking Terms Over Time" filed on Dec. 18, 2008; PCT/US08/87689 by Galit et al., titled "Computer-Implemented Methods, Program Product, and System to Enhance Banking Terms Over Time" filed on Dec. 19, 2008; U.S. patent application Ser. No. 12/417,162, by Ahlers et al., titled "System, Program Product, and Method For Debit Card and Checking Account Autodraw" filed on the same day herewith, all of which are each incorporated herein by reference in their entireties.

BACKGROUND

1. Field of Invention

The present invention relates generally to the financial service and card product industries, and, more particularly, to systems, computer program products, and associated methods of providing an automatic credit line draw in preselected increments for a prepaid card.

2. Background

Millions of prepaid cards are issued each year in the United States. It is known that many consumers rely primarily on cash and a prepaid card account for their personal finances; these consumers often do not have a traditional checking, savings, or other bank deposit account, and they usually do not write checks. These consumers typically do not have a credit card.

It is also known to use a prepaid card as payment for a proposed purchase at a merchant. The consumer proposes a purchase and submits the prepaid card to the merchant so that the merchant can request authorization from a prepaid card processor associated with the prepaid card. That is, the merchant checks that funds are available in the account associated with the prepaid card to cover the amount of the proposed purchase. This authorization process also provides an opportunity for security services, such as, for example, determining if the prepaid card has been reported as stolen. If there are insufficient funds available in the account associated with the prepaid card to cover the amount of the proposed purchase, the authorization request is denied by the prepaid card processor, and the proposed purchase is rejected by the merchant. Embarrassed and disappointed, many rejected consumers quickly give up and leave the merchant's premises so that even if a loan or credit were readily available with minimal effort, such as, for example, by placing a short phone call to the prepaid card processor or to a lender, the proposed purchase is abandoned.

It is known that consumers can receive a loan without having a bank account and that proceeds from a loan can be credited to or posted to a prepaid card. Loans, including, e.g., payday loans, payday advances, and other short-term cash advances, however, involve hassles of applying for and obtaining the loan prior to the consumer having access to the funds. In addition, inherent in requesting a loan is determining the amount of the loan. If the loan amount is too small, the consumer may need to obtain an additional loan, with additional fees; if the loan amount is too large, the consumer will needlessly pay extra interest.

SUMMARY OF INVENTION

In view of the foregoing, Applicant has recognized one or more sources of many of these problems and provides enhanced embodiments of methods, e.g., computerized methods, of advancing one or more preselected loan increments to a prepaid card, and associated systems and computer program products. According to embodiments of the present invention, a lending institution prequalifies a consumer for a line of credit for a prepaid card responsive to consumer underwriting data and predetermined qualification parameters, makes available draws to the line of credit line in an authorization stream for a proposed purchase using the prepaid card as payment, and loads a prepaid card in preselected loan increments so that the prepaid card then has a new amount that exceeds or equals the value of a proposed purchase. Next, for example, a new value for the line of credit balance available is determined, accounting for value loaded onto the prepaid card and a preselected loan advance fee for each loan increment loaded onto the prepaid card.

Embodiments of the present invention provide, for example, a computer-implemented method of advancing one or more preselected loan increments to a prepaid card. The computer-implemented method includes initiating consumer engagement of predetermined prepaid card approval and authorizing advancing of one or more preselected loan increments by the consumer upon approval by a lending institution up to a preauthorized total loan value. The preauthorized total loan value represents a maximum amount of value available to the consumer from the lending institution via a line of credit associated with the prepaid card as understood by those skilled in the art. The computer-implemented method also includes using the predetermined prepaid card to propose a purchase of one or more items, determining an amount of value of proposed purchase (including, for example, coupons, discounts, instant rebates, sales tax, or a combination thereof as understood by those skilled in the art), determining an amount of value on the predetermined prepaid card, and determining difference in amount of value of proposed purchase and the amount of value on the predetermined prepaid card. The computer-implemented method includes loading the predetermined prepaid card with an additional value equal to one or more preselected loan increments so that the prepaid card then has a new amount totaling the amount previously on the prepaid card plus the one or more preselected loan increments and so that the new amount exceeds or, alternatively, equals the value of the proposed purchase. The computer-implemented method also includes determining a predetermined loan advance fee for each increment of the one or more increments from the preauthorized total loan value.

According to other embodiments of the present invention, the consumer initiating engagement of approval can include, for example, the consumer opting in to a program with the lending institution using a written correspondence from the consumer, a consumer selection on a website, a telephone conversation with an interactive voice response unit, a telephone conversation with a customer service representative, a mobile phone, or a combination thereof as understood by those skilled in the art. That is, embodiments of the present invention provide numerous flexible and convenient ways to initiate consumer engagement of predetermined prepaid card approval. A line of credit amount, for example, can be established based on direct deposit and preselected underwriting formula, as understood by those skilled in the art, that use the amount of direct deposits, among other factors, to determine the size of the credit line available.

In addition, embodiments of the present invention provide, for example, a computer-implemented method of accessing a line of credit with a prepaid card. The computer-implemented method includes a lending institution prequalifying a consumer for a line of credit for a prepaid card responsive to consumer underwriting data and predetermined qualification parameters to thereby convert consumer underwriting data into line of credit data. The computer-implemented method further includes making available draws to the line of credit line in an authorization stream for a proposed purchase using the prepaid card as payment. The line of credit has a total loan value, a preselected loan increment, a preselected loan advance fee associated with each preselected loan increment, and a line of credit balance available. The computer-implemented method also includes loading the prepaid card with an additional value equal to one or more preselected loan increments so that the prepaid card then has a new amount totaling a previous amount of value on the prepaid card plus the amount of value of the one or more preselected loan increments and so that the new amount exceeds or, alternatively, equals the value of a proposed purchase. The computer-implemented method further includes determining a new value for the line of credit balance available. The new value is a previous value for the line of credit balance available minus the value loaded onto the prepaid card and minus fees, as each of the one or more preselected loan increments loaded onto the prepaid card generates a preselected loan advance fee.

By prequalifying the consumer for the line of credit responsive to consumer underwriting data and predetermined qualification parameters and making draws to the line of credit available in the authorization stream for a purchase using the prepaid card as payment, embodiments of the present invention advantageously allow a consumer to avoid the planning and hassle associated with determining the amount of a loan prior to proposing a purchase. Previously, a consumer would have to determine the amount of the loan necessary to fund the proposed purchase, then secure the loan, and only then propose the purchase at a merchant using the prepaid card. If the information necessary to determine the amount of the loan exists only at the merchant, multiple trips to the merchant may be required. Under the embodiments of the present invention, however, multiple trips are not required as the amount of the loan is determined, up to the total loan value, in the authorization stream for a proposed purchase using the prepaid card as payment, resulting in fewer rejections of proposed purchases, less embarrassment for consumers, and reduced cost due to fewer abandoned sales as understood by those skilled in the art. Advantageously, under the embodiments of the present invention, the consumer only pays for what is actually drawn.

By loading the prepaid card in preselected loan increments, embodiments of the present invention advantageously can guarantee a fee structure that is proportional to the amount of credit accessed. By comparison, an overdraft fee charge by a bank for "bounced" check is often larger than the overdraft amount. Instead, the fee structure according to embodiments of the present invention more closely resembles an automated teller machine (ATM) fee from a consumer's point of view as understood by those skilled in the art. In addition, the use of preselected loan increments can often result in value remaining on the prepaid card, allowing for small transactions without generating additional loan fees. For example, after of a load of a preselected loan increment of $50 and subsequent purchase transaction, the balance on the prepaid card ranges from $0.00 to $49.99.

Embodiments of the present invention provide, for example, a system of advancing one or more preselected loan increments to a prepaid card. The system includes a lending institution computer positioned to manage a line of credit associated with a prepaid card, i.e., to control access to funds from a line of credit associated with a prepaid card; a plurality of merchant computers positioned to determine an amount of value of a proposed purchase of one or more items; a plurality of point-of-sale terminals, each in communication with a merchant computer; and a third computer associated with a customer prepaid card account defining a prepaid card processor. The prepaid card processor is in communication with the lending institution computer and the plurality of acquiring processors of the point-of-sale terminal through an electronic communications network. The prepaid card processor is positioned to process an authorization request for a proposed purchase of one or more items from an acquiring processor of the point-of-sale terminal. The system further includes a computer program product associated with the lending institution computer as discussed herein.

Embodiments of the present invention provide, for example, a computer program product associated with the lending institution computer, stored on a tangible computer memory media, and operable on a computer, the computer program product comprising a set of instructions that, when executed by the computer, cause the computer to perform various operations. The operations include prequalifying a consumer for a line of credit for a prepaid card by the lending institution responsive to consumer underwriting data and predetermined qualification parameters to thereby convert consumer underwriting data into line of credit data. The operations further include making available draws to the line of credit line in an authorization stream for a proposed purchase of one or more items using the prepaid card as payment. The proposed purchase data can be, for example, received by the lending institution computer through the electronic communications network from a card reader device associated with a point of sale terminal. The operations further include loading the prepaid card with an additional value equal to one or more preselected loan increments so that the prepaid card then has a new amount totaling a previous amount of value on the prepaid card plus the amount of value of the one or more preselected loan increments and so that the new amount exceeds or, alternatively, equals the value of a proposed purchase to thereby convert line of credit data into a value associated with the prepaid card to thereby fund the proposed purchase. The operations also include determining a new value for the line of credit balance available, in which the new value is a previous value for the line of credit balance available minus a value equal to the one or more preselected loan increments loaded onto the prepaid card and minus a value equal to one or more preselected loan advance fees associated with each of the one or more preselected loan increments loaded onto the prepaid card.

Additional embodiments of the present invention include a computer program product stored on a tangible computer memory media, operable on a computer, and associated with a prepaid card processor.

According to another embodiment of the present invention, the financial institution can be a federally-chartered bank subject to federal banking laws and regulations and not subject to state banking laws and regulations. Also, the line of credit program can be bank product so that the line of credit program complies with federal Regulation Z.

In addition, embodiments of the present invention include systems, program products, and associated methods of advancing one or more preselected loan increments to a prepaid card and accessing a line of credit with a prepaid card as will be understood by those skilled in the art.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 6 is a schematic diagram of loan set up flow according to embodiments of the present invention;

FIG. 7 is a schematic front elevational view of an embodiment of an access interface of a program product and system in the form of a graphical user interface of a display of a computer according to an embodiment of the present invention;

FIG. 11 is a front plan view of a display screen of a computer displaying an excerpt of an account activity statement according to an embodiment of the present invention; and FIG. 12 is a schematic flow diagram of a method of accessing a line of credit with a prepaid card according to another embodiment of the present invention.

DETAILED DESCRIPTION

Figure 1:
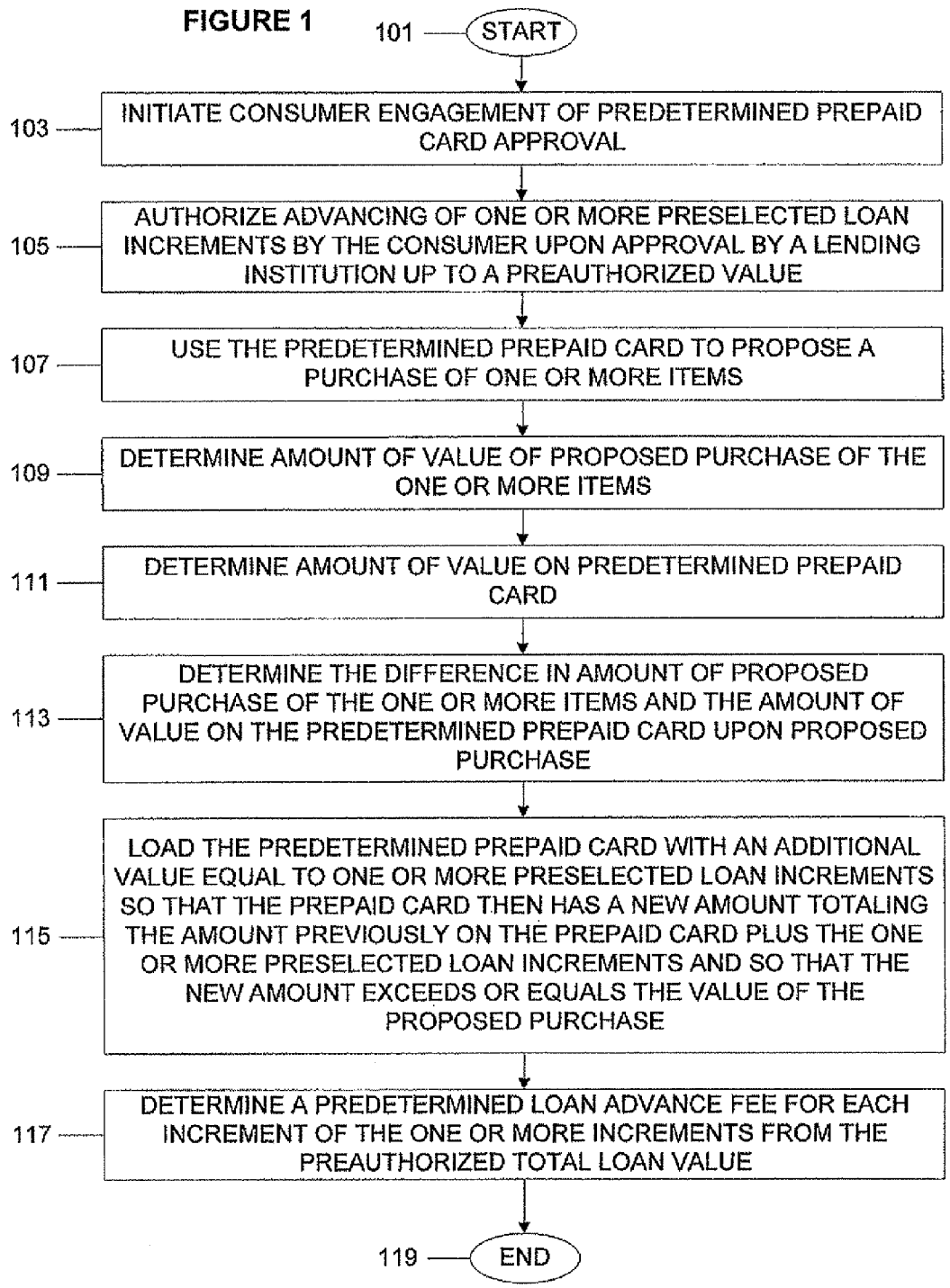
FIG. 1 is a schematic flow diagram of a method of advancing one or more preselected loan increments to a prepaid card according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As illustrated in FIG. 1, embodiments of the present invention include a method, e.g., a computerized method, of advancing one or more preselected loan increments to a prepaid card. The method includes initiating consumer engagement of predetermined prepaid card approval 103. The method further includes authorizing advancing of one or more preselected loan increments by the consumer upon approval by a lending institution up to a preauthorized total loan value 105. The preauthorized total loan value represents a maximum amount of value available to the consumer from the lending institution via a line of credit associated with the prepaid card as understood by those skilled in the art. The method also includes using the predetermined prepaid card to propose a purchase of one or more items 107. The method further includes determining amount of value of proposed purchase of the one or more items 109. According to other embodiments of the present invention, determining amount of value of proposed purchase of the one or more items can include, for example, coupons, discounts, instant rebates, sales tax, or a combination thereof as understood by those skilled in the art. The method also includes determining amount of value on the predetermined prepaid card 111 and determining difference in amount of value of proposed purchase of the one or more items and the amount of value on the predetermined prepaid card upon proposed purchase 113. The method includes loading the predetermined prepaid card with an additional value equal to one or more preselected loan increments so that the prepaid card then has a new amount totaling the amount previously on the prepaid card plus the one or more preselected loan increments and so that the new amount exceeds or, alternatively, equals the value of the proposed purchase 115. The method also includes determining a predetermined loan advance fee for each increment of the one or more increments from the preauthorized total loan value 117.

According to other embodiments of the present invention, the consumer initiating engagement of approval can include, for example, the consumer opting in to a program with the lending institution using a written correspondence from the consumer, a consumer selection on a website, a telephone conversation with an interactive voice response unit (IVRU), a telephone conversation with a customer service representative, a mobile phone, or a combination thereof as understood by those skilled in the art. That is, embodiments of the present invention provide numerous flexible and convenient ways to initiate consumer engagement of predetermined prepaid card approval. When launched as an accessible website, for example, the website can provide various software based program product segments, as will be understood by those skilled in the art, from which bank products are accessible or downloadable. The website preferably includes secure site pages or portions, as understood by those skilled in the art, as financial and personal data on or for customers may be provided by a customer. As described herein, the website in an exemplary embodiment includes prepaid card management capabilities as understood by those skilled in the art to enhance qualification of customers and tracking of customer usage data or history. By including this feature, embodiments of other program products, methods, and systems can be enhanced and provided.

In an embodiment of the present invention involving prequalifying a consumer for a line of credit from a bank or other lending institution, the lending institution can require or define, for example, the following initial qualification parameters for a customer: (1) customer should be a prepaid card customer; (2) customer should provide employment and wage verification through a direct deposit history; (3) customer should authorize bank initiated withdrawals from their prepaid card; and (4) customer should have a history of at least one electronic deposit. In addition, the following ongoing criteria, for example, should be met: (1) customer's card account should be in good standing, not overdrawn, cancelled, or in default of the customer agreement; and (2) customer should continue to initiate electronic deposits to the card. The bank or lending institution, for example, can elect to make the account ineligible for a line of credit if an electronic deposit ceases. The bank can have a dedicated program manager qualify, approve, or authorize a customer or can use program product stored in memory to make sure the criteria or parameters are satisfied or meet certain thresholds as selected by the bank or lending institution.

For example, as illustrated in FIG. 6, a customer C can go on-line through a computer or IVRU 22 in a system 20 to register at a website using a program product according to embodiments of the present invention and launched from a server, e.g., at a loan processor, underwriting organization, bank, lending institution, other financial institution, payroll processing company, or other entity which can provide the line of credit product, among others, as will be understood by those skilled in the art. The form or qualification parameters can be consistent with one or more underwriting organizations or institutions or set/defined by the bank or lending institution.

As understood by those skilled in the art, a loan, micro-loan, repayment, line of credit, or other type of payment processor, such as provided by First Data Corporation, Total Systems Services, Inc., Fidelity National Information, Inc., or as custom developed by a bank, a financial institution, or other organization, operates to provide a customer interface on a line of credit or micro-loan request (see, e.g., access interface 700 of FIG. 7 in the form of a computer display having a graphical user interface) and determines and decides whether a potential or existing customer qualifies for a line of credit product. First Data Corporation, formerly First Data Resources, is a transaction processing company, including prepaid cards, and is headquartered in Greenwood Village, Colo., as understood by those skilled in the art. With headquarters located in Columbus, Ga., Total System Services, Inc. provides electronic payment services to financial institutions and companies, including consumer-finance, credit, debit, healthcare, loyalty, prepaid, chip and mobile payments, as understood by those skilled in the art. Headquartered in Jacksonville, Fla., Fidelity National Information, Inc. provides core processing for financial institutions, including card issuer, transaction processing, and outsourcing services to financial institutions and retailers, as understood by those skilled in the art. The line of credit or loan processor 319, for example, can be outsourced by a bank if desired, and numerous different loan processors or entities that handle this function can be used as well (see, e.g., FIG. 3 with computer server 319 handling the payment processor and interface access roles for customer lines of credit 321, for example). If the customer qualifies, the credentials can be passed to a bank computer 307 or other financial institution computer, and then a flag, code, notation, or other identifier can be associated with a customer's profile in a database 308 so that when the customer desires to access the line of credit, e.g., through a customer purchase transaction using the prepaid card, the process acknowledges the identifier to then allow incremental micro-loans on the line of credit to be granted as described herein. Notably, often a loan or other type of payment processor is card processor specific, and in this instance, a dedicated card processor (see, e.g., prepaid card processor 315 in FIG. 3, and this processor likewise can be associated with computers and have a customer prepaid card account 317 associated with or processed thereby as understood by those skilled in the art) can be used, but also as shown in FIG. 6 and described further in U.S. Provisional Patent Application Ser. No. 61/029,975 titled "Methods To Advance Loan Proceeds on Prepaid Cards, Associated Systems and Computer Program Products" filed on Feb. 20, 2008 and incorporated herein by reference methods can be used as well to handle card interface to a variety of card processors, including, e.g., Metavante Corporation ("Metavante") of Milwaukee, Wis., as understood by those skilled in the art.

The customer transaction using a prepaid card, for example, can then cause the request for the loan advance through the line of credit processor 30 or other payment processor. The credit processor 30 then posts notification of the micro-loan request through an application program interface (API) to post the loan advance in real time through an API Router 32 as understood by those skilled in the art. The API Router 32 passes the request through a security firewall 35 which passes the request through the API to a card processor 42 and particular processor API 44, such as, Metavante. The request data can be compared to flat files 46, 60, 70, e.g., data files that have no structural relationship as understood by those skilled in the art, or flat files database so that the bank or institution reconciles the loan transaction with the customer's line of credit or other account 62. Some card processors, for example, provide additional processor interfaces or allow development of additional processor interfaces, as understood by those skilled in the art, (see, e.g., API to Program Manager 52). Program manager operations, for example, can be provided by various financial solution/program management companies, such as AccountNow of San Ramon, Calif., as understood by those skilled in the art. A program manager 54, a card processor API 56, and a card processor 58 can be used by the credit processor or other payment processor for a customer transaction as understood by those skilled in the art.

The following example illustrates an embodiment of the present invention. See also FIG. 11. A consumer initiates engagement through a phone call with a customer service representative and receives approval by the lending institution for a line of credit for a prepaid card with preselected loan increments of $20 with a $2.50 fee per increment. The consumer proposes to purchase items with a value of $42, but only has a prepaid card balance of $21. The consumer, however, also has $60 available on the line of credit, with an outstanding balance of $0. When the consumer proposes the purchase, the amount of value of the proposed purchase is determined to be $42 (as this example assumes no coupons, discounts, instant rebates, or sales tax for illustrative purposes). The amount of value on the prepaid card is determined to be $21. Then the difference is determined to be $21. Next, two (2) preselected increments of $20 each, for a total value of $40, are loaded onto the prepaid card so that the prepaid card then has a new amount, in this example $61, totaling the amount previously on the prepaid card ($21) plus the one or more preselected loan increments (2×$20=$40) and so that the new amount exceeds or, alternatively, equals the value of the proposed purchase ($61≧$42). The purchase is transacted, and the prepaid card balance after the purchase is $19 ($61−$42=$19). The loan fee is determined to be $5 (2×$2.50=$5). The line of credit balance outstanding is now $45, which is calculated as a previous balance ($0) plus the value of the preselected increments loaded onto the prepaid card ($40) and the value of the loan fee ($5). Therefore, there remains $15 available on the line of credit ($60−2×$20−2×$2.50=$15).

In other embodiments of the present invention, the lending institution can make available only a part of the preauthorized total loan value available for loading onto the prepaid card, responsive to a consumer determination, so that the consumer retains maximum control. For example, the consumer determines to make available only $75 of the preauthorized total loan value, of say $200. The amount of value of the proposed purchase is determined to be $98; the amount of value on the prepaid card is determined to be $20; and the difference is determined to be $78. Because the difference is greater than the amount available for loading onto the prepaid card, authorization for the proposed purchase is denied, and the proposed purchase is rejected.

As understood by those skilled in the art, by loading the prepaid card only in preselected loan increments, embodiments of the present invention advantageously can guarantee a fee structure that is proportional to the amount of credit accessed. By comparison, an overdraft fee charge by a bank for "bounced" check is often by larger than the overdraft amount. Instead, the fee structure according to embodiments of the present invention more closely resembles an automated teller machine (ATM) fee. In addition, the use of preselected loan increments can often result in value remaining on the prepaid card, allowing for small transactions without generating additional loan fees. For example, after of a load of a preselected loan increment of $50 and subsequent purchase transaction, the balance on the prepaid card ranges from $0.00 to $49.99.

According to another embodiment of the present invention, the financial institution can be a federally-chartered bank subject to federal banking laws and regulations and not subject to state banking laws and regulations. Therefore, the federally-chartered financial institution enjoys rate preemption; that is, state licensing requirements, as well as regulations in many states that limit lending interest rates, are preempted and do not apply to the federally-chartered financial institution. As understood by those skilled in the art, a federally-chartered financial institution can operate in every state with a consistent implementation nationally rather than a state-by-state approach, can provide consumers with Regulation Z protection, and can charge any loan or interest rate for the gap filling loans or immediate financing loans without regard to state law.

According to another embodiment of the present invention, the lending institution can adjust the preauthorized total loan value and repayment terms based on the performance of the consumer. That is, a consumer with good repayment history can typically earn access to a larger line of credit.

Figure 2:
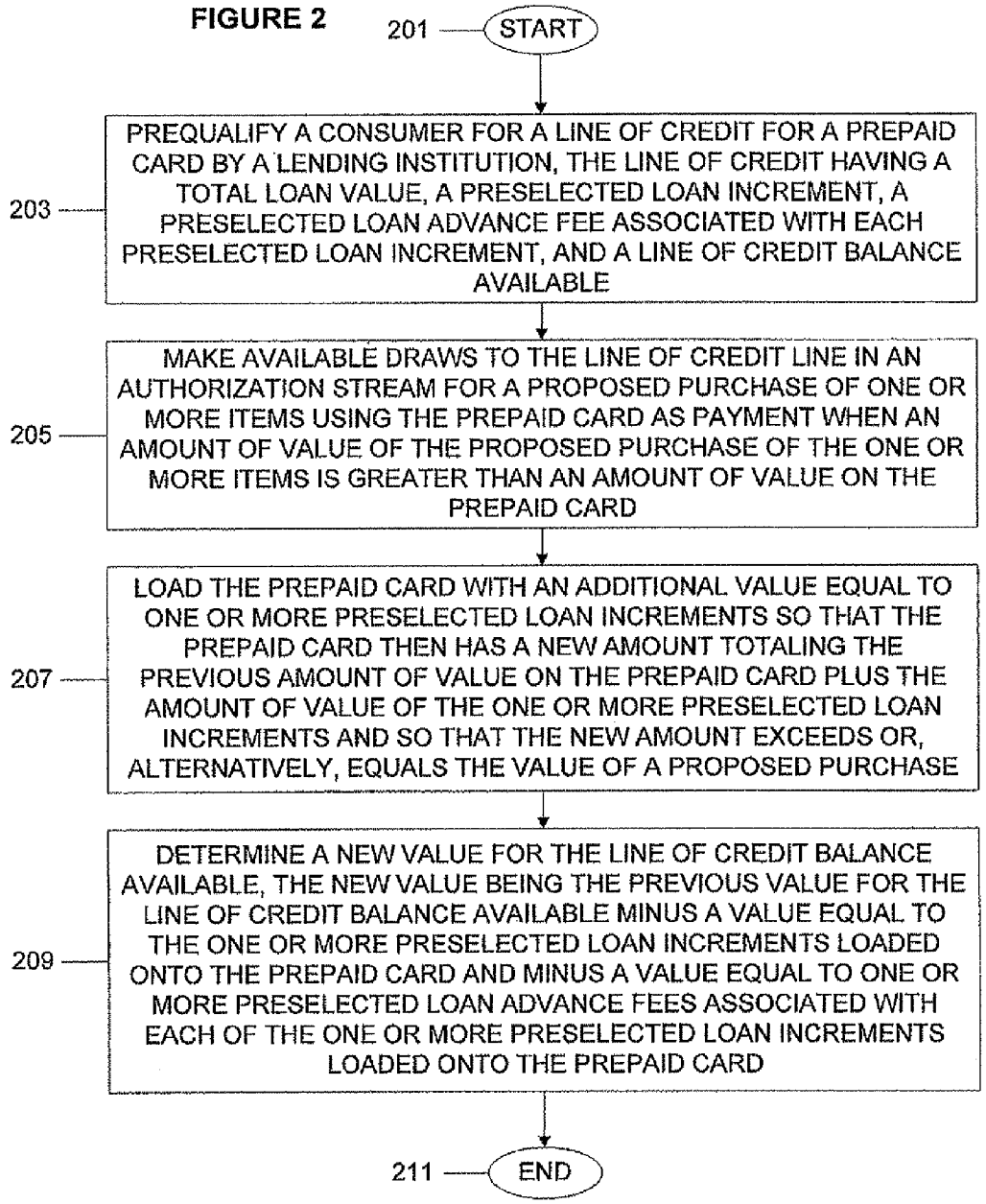
FIG. 2 is a schematic flow diagram of a method of accessing a line of credit with a prepaid card according to another embodiment of the present invention.

As illustrated in FIG. 2, embodiments of the present invention include a computer-implemented method of accessing a line of credit with a prepaid card. The computer-implemented method includes prequalifying a consumer for a line of credit for a prepaid card by a lending institution 203 responsive to consumer underwriting data and predetermined qualification parameters to thereby convert consumer underwriting data into line of credit data. The line of credit has a total loan value, a preselected loan increment, a preselected loan advance fee associated with each preselected loan increment, and a line of credit balance available. The computer-implemented method also includes making available draws to the line of credit line in an authorization stream for a proposed purchase of one or more items using the prepaid card as payment when an amount of value of the proposed purchase of the one or more items is greater than an amount of value on the prepaid card

205. The proposed purchase data can be, for example, received by the lending institution computer through the electronic communications network from a card reader device associated with a point of sale terminal. The computer-implemented method further includes loading the prepaid card with an additional value equal to one or more preselected loan increments so that the prepaid card then has a new amount totaling a previous amount of value on the prepaid card plus the amount of value of the one or more preselected loan increments and so that the new, amount exceeds or, alternatively, equals the value of a proposed purchase 207 to thereby convert line of credit data into a value associated with the prepaid card to thereby fund the proposed purchase. The computer-implemented method also includes determining a new value for the line of credit balance available, the new value being a previous value for the line of credit balance available minus a value equal to the one or more preselected loan increments loaded onto the prepaid card and minus a value equal to one or more preselected loan advance fees associated with each of the one or more preselected loan increments loaded onto the prepaid card 209.

As understood by those skilled in the art, by prequalifying the consumer for the line of credit and making draws to the line of credit available in the authorization stream for a purchase using the prepaid card as payment, embodiments of the present invention advantageously allow a consumer to avoid the planning and hassle associated with determining the amount of a loan prior to proposing a purchase. Previously, a consumer would have to determine the amount of the loan necessary to fund the proposed purchase, then secure the loan, and only then propose the purchase at a merchant using the prepaid card. If the information necessary to determine the amount of the loan exists only at the merchant, multiple trips to the merchant may be required. Under the embodiments of the present invention, however, multiple trips are not required as the amount of the loan is determined, up to the total loan value, in the authorization stream for a proposed purchase using the prepaid card as payment, resulting in fewer rejections of proposed purchases, less embarrassment for consumers, and reduced cost due to fewer abandoned sales as understood by those skilled in the art. Advantageously, under the embodiments of the present invention, the consumer only pays for what is actually drawn.

Figure 3:
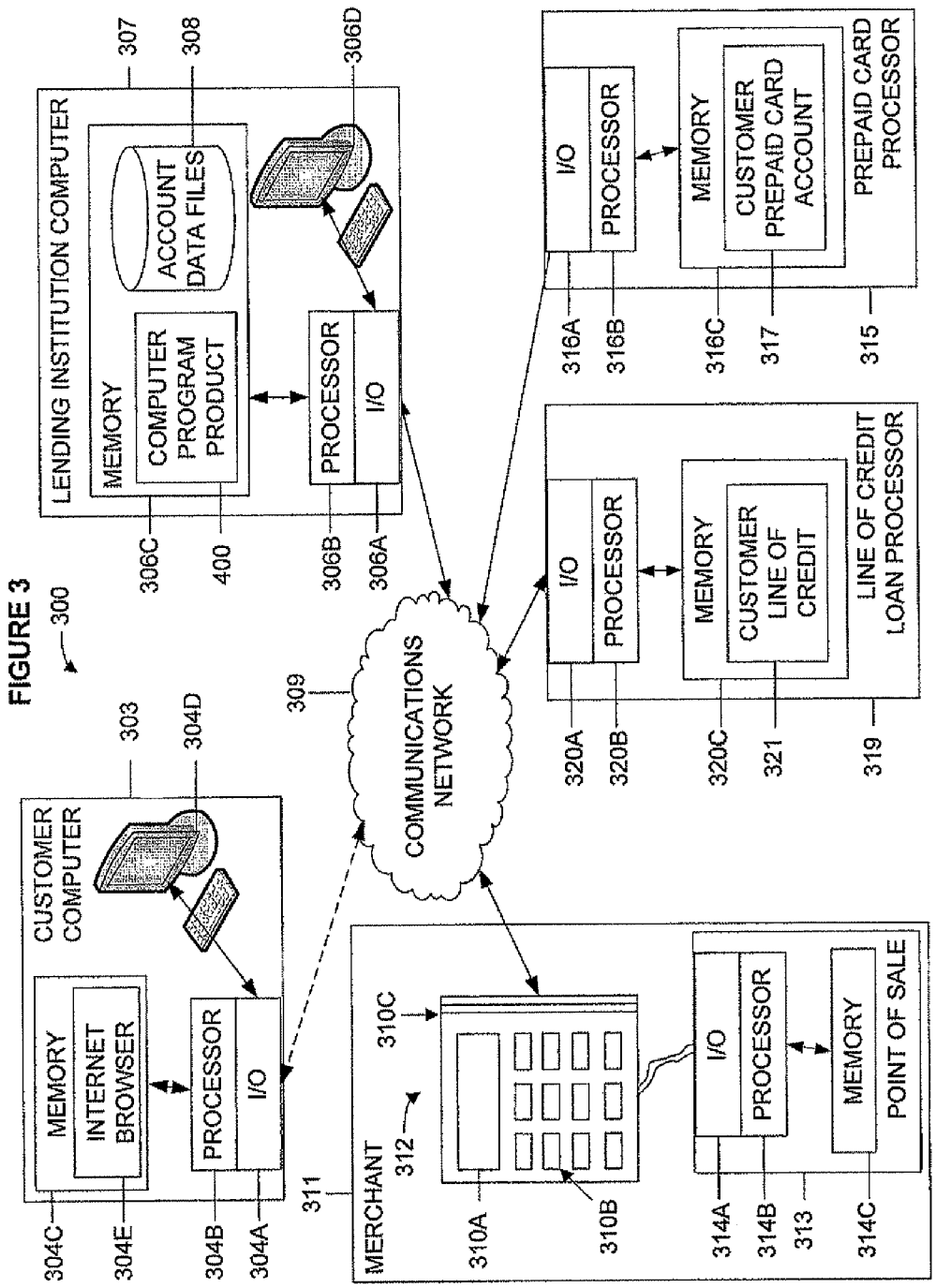
FIG. 3 is a schematic block diagram of a system of advancing one or more preselected loan increments to a prepaid card according to an embodiment of the present invention.

As illustrated in FIG. 3, embodiments of the present invention include a system of advancing one or more preselected loan increments to a prepaid card. The system 300 includes a first computer associated with a lending institution defining a lending institution computer 307. The lending institution computer 307 can include, for example, input-output I/O devices 306A; one or more processors 306B; memory 306C, such as, computer readable media; and a display 306D. The memory 306C of the lending institution computer 307 can include a computer program product 400 as described herein and can include, for example, one or more databases containing account data files 308. The lending institution computer 307 is positioned to manage a line of credit associated with a prepaid card, i.e., to control access to funds from a line of credit associated with a prepaid card. The system 300 also includes a plurality of second computers associated with a plurality of merchants 311 defining a merchant computer 313. Each merchant computer 311 can include, for example, input-output I/O devices 314A; one or more processors 314B; and memory 314C, such as, computer readable media. Each merchant computer 313 is positioned to determine an amount of value of a proposed purchase of one or more items. The system 300 further includes a plurality of point-of-sale terminals 312 associated with the plurality of merchants 311.

Each point-of-sale terminal 312 has a processor defining an acquiring processor and is in communication with a merchant computer 313. Prepaid card data can be read by swiping the card through a slot 310C past a reading head of a point-of-sale terminal 312. The point-of-sale terminal 312 can also include a display 310A and input/output (I/O) devices 310B, e.g., a keypad. The system 300 can also include a third computer associated with a plurality of customer prepaid card accounts 317 defining a prepaid card processor 315. The prepaid card processor 315 is in communication with the lending institution computer 307 and the plurality of acquiring processors of the point-of-sale terminal 312 through an electronic communications network 309. The prepaid card processor 315 is positioned to process an authorization request for a proposed purchase of one or more items from an acquiring processor of the point-of-sale terminal 312. The prepaid card processor 315 can include one or more processors 316B, an I/O device 316A and non-transitory memory 316C. The system 300 can also include a plurality of customer computers 303. Each customer computer 303 can include, for example, input-output I/O devices 304A; one or more processors 304B; non-transitory memory 304C, such as, computer readable media; and a display 304D. The memory 304C of the customer computer 303 can include an Internet browser 304E, a computer application used for accessing sites or information on a network, as understood by those skilled in the art. The system 300 further includes a computer program product associated with the lending institution computer 307, stored on a tangible computer memory media, and operable on a computer, the computer program product comprising a set of instructions that, when executed by the computer, cause the computer to perform various operations as discussed herein.

Figure 4:
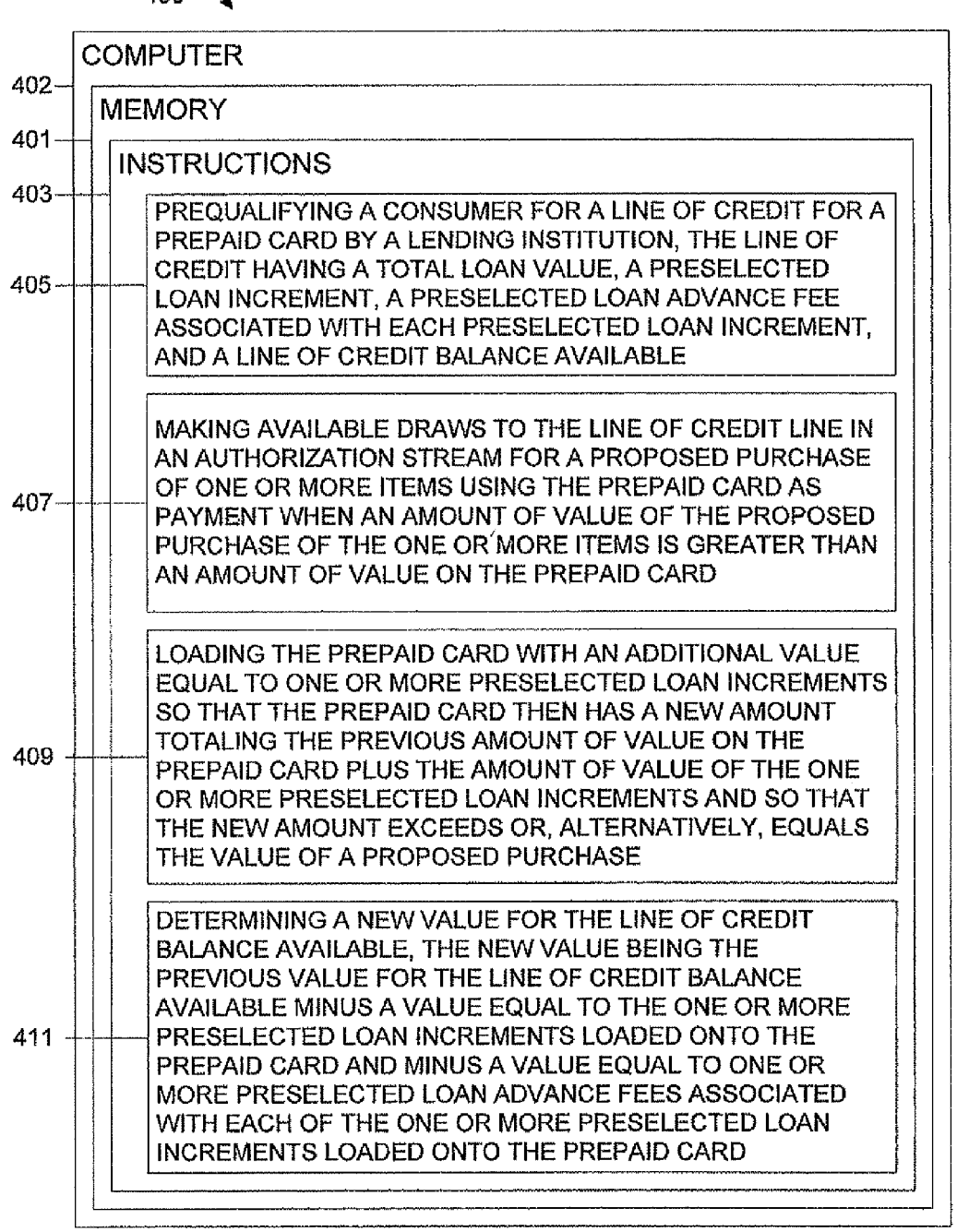
FIG. 4 is a partial schematic diagram of a computer program product according to an embodiment of the present invention.

As illustrated in FIG. 4, embodiments of the present invention include a computer program product 400 associated with the lending institution computer 402, stored on a tangible computer memory media 401, and operable on a computer, the computer program product 400 comprising a set of instructions 403 that, when executed by the computer, cause the computer to perform various operations. The operations include prequalifying a consumer for a line of credit for a prepaid card by the lending institution 405 responsive to consumer underwriting data and predetermined qualification parameters to thereby convert consumer underwriting data into line of credit data. The line of credit has a total loan value, a preselected loan increment, a preselected loan advance fee associated with each preselected loan increment, and a line of credit balance available. The operations also include making available draws to the line of credit line in an authorization stream for a proposed purchase of one or more items using the prepaid card as payment when an amount of value of the proposed purchase of the one or more items is greater than an amount of value on the prepaid card 407. The proposed purchase data can be, for example, received by the lending institution computer through the electronic communications network from a card reader device associated with a point of sale terminal. The operations further include loading the prepaid card with an additional value equal to one or more preselected loan increments so that the prepaid card then has a new amount totaling a previous amount of value on the prepaid card plus the amount of value of the one or more preselected loan increments and so that the new amount exceeds or, alternatively, equals the value of a proposed purchase 409 to thereby convert line of credit data into a value associated with the prepaid card to thereby fund the proposed purchase. The operations also include determining a new value for the line of credit balance available, in which the new value is a previous value for the line of credit balance available minus a value equal to the one or more preselected loan increments loaded onto the prepaid card and minus a value equal to one or more preselected loan advance fees associated with each of the one or more preselected loan increments loaded onto the prepaid card 411.

Figure 5:
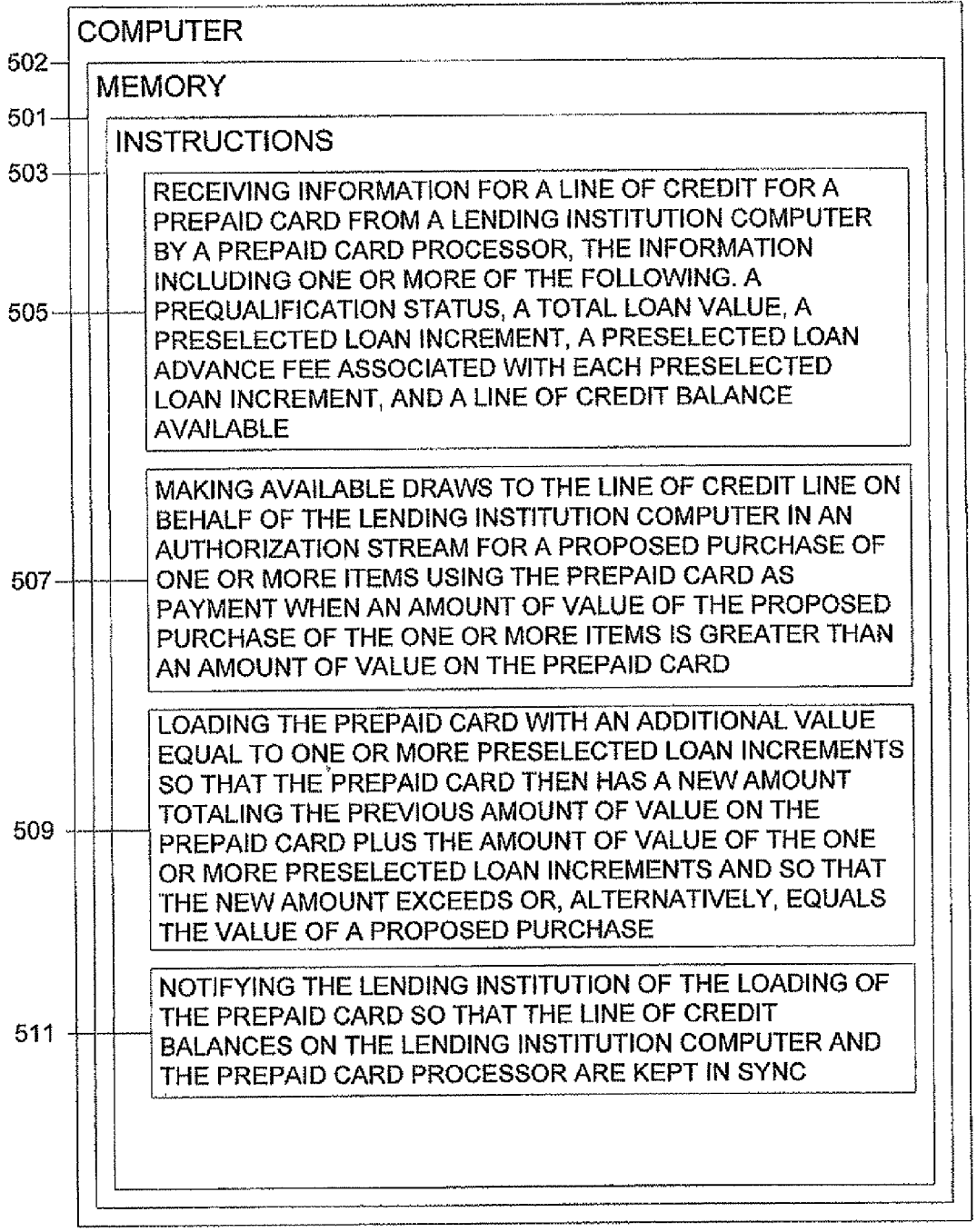
FIG. 5 is a partial schematic diagram of another computer program product according to another embodiment of the present invention.

As illustrated in FIG. 5, embodiments of the present invention include a computer program product 500 stored on a tangible computer memory media 501, operable on a computer, and associated with a prepaid card processor 502, the computer program product 500 comprising a set of instructions 503 that, when executed by the computer, cause the computer to perform various operations. The operations include receiving information, e.g., data, for a line of credit for a prepaid card from a lending institution computer by a prepaid card processor 505. The information, e.g., data, can include a prequalification status responsive to consumer underwriting data and predetermined qualification parameters, a total loan value, a preselected loan increment, a preselected loan advance fee associated with each preselected loan increment, a line of credit balance available, and a combination thereof. The operations also include making available draws to the line of credit line on behalf of the lending institution computer in an authorization stream for a proposed purchase of one or more items using the prepaid card as payment when an amount of value of the proposed purchase of the one or more items is greater than an amount of value on the prepaid card 507. The proposed purchase data can be, for example, received by prepaid card processor through the electronic communications network from a card reader device associated with a point of sale terminal. The operations further include loading the prepaid card with an additional value equal to one or more preselected loan increments so that the prepaid card then has a new amount totaling a previous amount of value on the prepaid card plus the amount of value of the one or more preselected loan increments and so that the new amount exceeds or, alternatively, equals the value of a proposed purchase 509 to thereby convert line of credit data into a value associated with the prepaid card to thereby fund the proposed purchase. The operations also include notifying the lending institution of the loading of the prepaid card so that the line of credit balances on the lending institution computer and the prepaid card processor are kept in sync 511.

According to embodiments of the present invention, the prepaid card processor can communicate with the lending institution computer in real-time, near real-time, in a batch process, daily, or periodically, as understood by those skilled in the art, to assess if a line of credit is available and if a draw is available, or to update line of credit balances.

Other embodiments of the present invention, for example, can include a stand-in account at the prepaid card processor associated with the line-of-credit or the lending institution to facilitate loading the prepaid card as will be understood by those skilled in the art. A stand-in account allows a consumer to have transactions approved even when the primary authorization system is technically unavailable. This is achieved by one processor using data and instructions provided to it by the authorizing processor to "stand in" and approve or decline transactions on the authorizing processor's behalf if the authorizing processor system is unavailable for real-time processing.

In other embodiments of the present invention, rather than loading the prepaid card in preselected loan increments with each increment associated with a preselected loan advance fee, the prepaid card can be loaded through a draw for an exact amount of purchase at a defined rate. In such embodiment, a standard consumer draw on the line of credit could be in $20 increments, but when an auto-draw is initiated by a purchase at a point of sale or an automated teller machine (ATM) withdrawal, the exact amount of funds needed to be borrowed will be advanced. As a result, for example, the fee amount assessed for a $20 draw might be $2.50, while if the amount borrowed on an auto-draw is only $10 the fee would be assessed ratably and would be $1.25 for the borrowing.

Embodiments of the present invention can, for example, include repayment of at least portions of the line of credit responsive to a subsequent direct deposit received for customer's benefit by the bank so that the repayment of the at least portions of the line of credit is deducted from the subsequent direct deposit. That is, loans made under a line of credit can be repaid out of the proceeds of a direct deposit. Recurring direct deposits include, for example, employer payroll funds, federal or state government electronic benefits payments, annuities, dividends, interest payments, lottery winnings, royalty payments, and other streams of payments as understood by one skilled in the art.

Embodiments of systems, program products, and methods of the present invention can include, for example, for substantially all programs if desired, features such as any repayment of draws on the line of credit can be automatically collected from the next electronic deposit regardless of payment source. As payments are received, fees also can be paid first then the payment applied to the oldest outstanding draw amount. When payments are received, total available line limit is restored by the payment amount. If funds from the electronic deposit are not sufficient to cover the outstanding balance, a partial repayment can be made in the full amount of the electronic deposit resulting in an unpaid balance on the line. Repayment of the remaining unpaid balance can be taken from subsequent electronic deposits until the line has been paid in full. Other cash equivalent repayment options also can be accepted and processed by a line of credit processor as understood by those skilled in the art.

Figure 8:
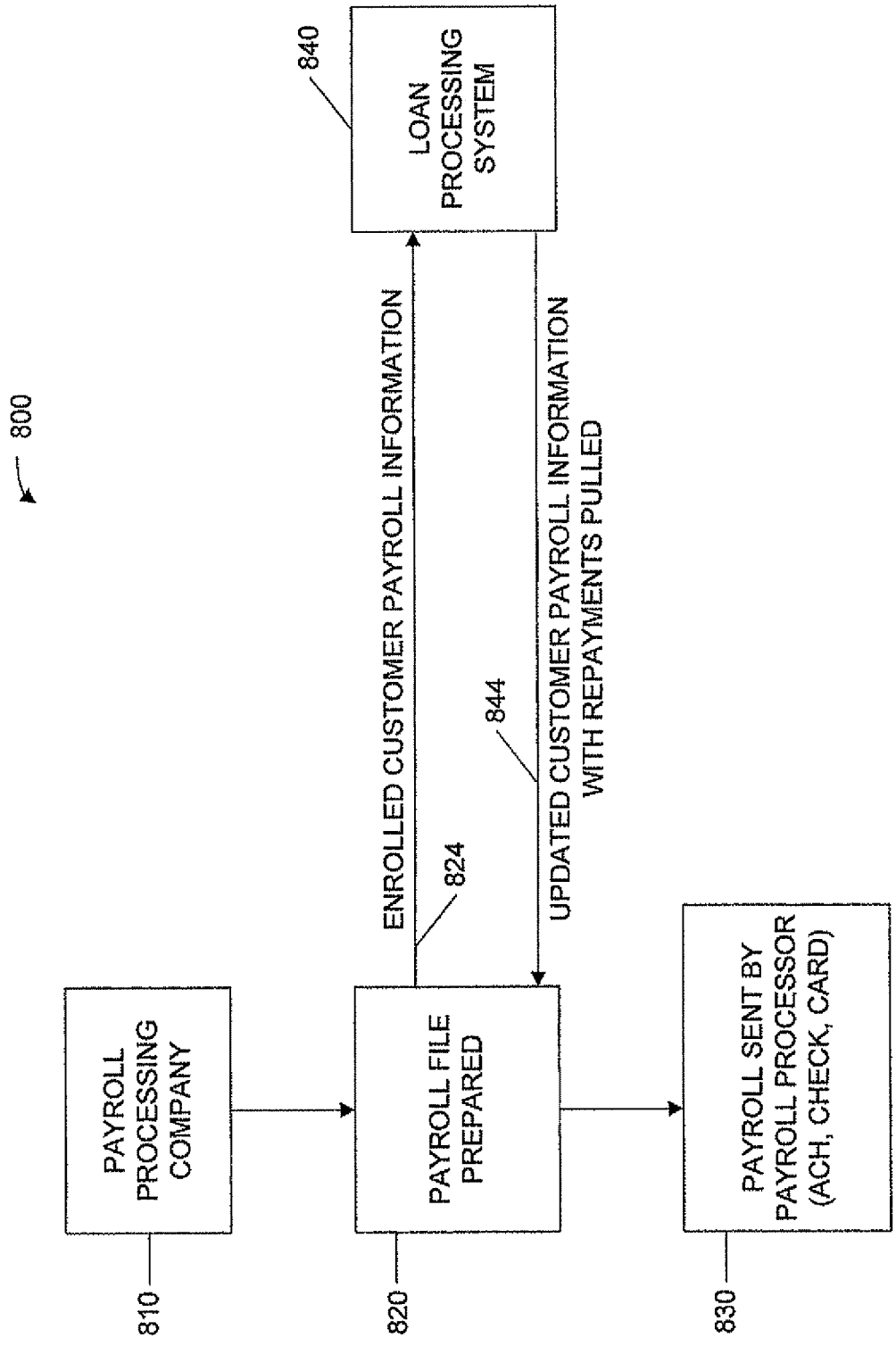
FIG. 8 is a schematic diagram of a payroll processor system according to an embodiment of the present invention.

It will also be understood by those skilled in the art that embodiments of the line of credit product or program product, for example, can be associated with a payroll processing company that processes direct deposits (see, e.g., FIG. 8). Embodiments of the program product and methods can be added to product or service offerings by the payroll processing company 810 so that it can be offered to their customers independent of bank by taking money or funds out at the source 810, e.g., as the payroll file is prepared 820 and before the direct deposit is even originated, or loaded onto a prepaid card, for example. These embodiments can also allow the processing company 810 to have more direct information on employment history. A payroll processing company 810 can also use a loan processing system 840, loan processor, or other payment processor either within their facilities or as an outsourcing entity to allow the provision of enrolling and providing customer payroll information 824 and for tracking and reconciling repayment or updated customer payroll information with repayments pulled 844. The payroll can be sent, loaded or processed by a payroll processor 830 for ACH transmittal, check generation, or card loading/providing, for example (see, e.g., FIG. 8). These embodiments of associated methods, for example, can include providing a prepaid card to an employee who gets direct deposit to a demand deposit accounts (DDA) whereby the consumer borrow funds from the service/product and has those funds direct deposited onto the card instantly and repaid by pulling funds from the direct deposit file prior to sending to the other bank account to repay the amount withdrawn. An example of and more details on how repayment can be accomplished is illustrated in U.S. Provisional Patent Application Ser. No. 61/016,213 titled "Transfer Account Systems, Computer Program Products, and Associated Methods" filed on Dec. 21, 2007 which is incorporated herein by reference in its entirety.

Additionally, along these lines, any repayment of a line supersedes repayment of a negative balance on a card due to force posts or settlement transactions that cause the card to go negative. Any monies remaining after a payment is received can be credited to the prepaid card account. If payment takes the card balance to $0, any transactions attempted with the card can be declined. Those transactions can be subject to any related decline fees. Repayment of a draw, for example, should not be taken from the principal balance on a card. That is, if a card balance is positive prior to a draw, only when the next electronic deposit is initiated to the card will repayment be triggered. If a draw is not paid within the preselected time period, preferably days, e.g., 35 day timeframe, any amount owed can be taken from the principal balance on a card.

Figure 9:
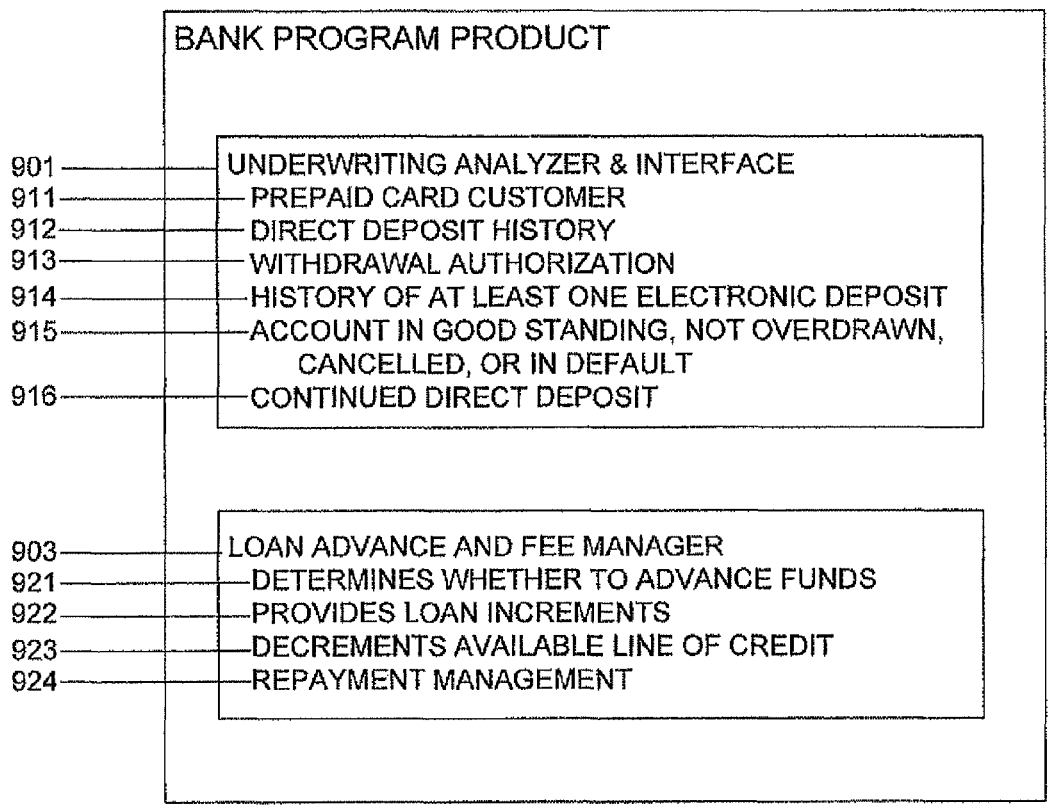
FIG. 9 is a schematic diagram of a program product according to an embodiment of the present invention.

Embodiments of the present invention provide, for example, a program product 900 associated with a bank or other financial or lending institution implemented in modules or components, as illustrated in FIG. 9. An underwriting analyzer and interface component 901 of a bank program product 900 can receive underwriting information, e.g., data, and make the determination whether to offer a line of credit or other product to the customer as understood by those skilled in the art. That is, an underwriting analyzer and interface component 901 can respond to a consumer initiated engagement and can determine whether to prequalify the consumer for a line of credit. Underwriting data can include whether a customer is an existing prepaid card customer 911; a direct deposit history 912; a withdrawal authorization or approval, from an enrollment in a line of credit program; a history of at least one electronic deposit 914; an account being in good standing, not overdrawn, cancelled, or in default 915; continued direct deposit 916; and other data as understood by those skilled in the art. In addition, a loan advance and fee manager module 903 deals with determining whether to advance funds 921, providing loans in predetermined increments 922, calculating available credit 923, managing repayments 924, and other associated tasks as understood by those skilled in the art. Other architectures and organizations will be understood by those skilled in the art to be included within the embodiments of the present invention. Program products can be implemented in a variety of software and programming languages, including without limitation hypertext markup, language ("HTML"), Java, C, C++, XML, and others as understood by those skilled in the art.

Figures 10A, 10B:
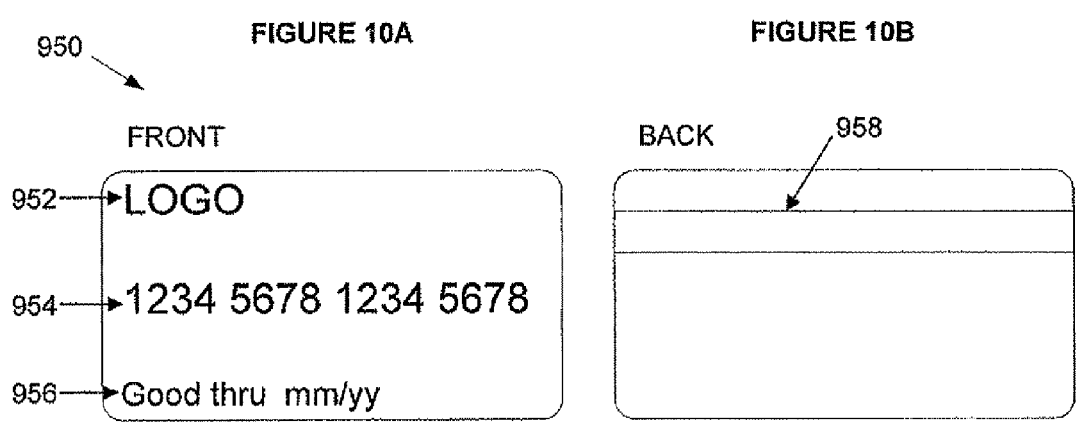
FIGS. 10A and 10B are respective front and back plan views of a prepaid card according to an embodiment of the present invention.

As illustrated in FIGS. 10A, 10B, and 3, embodiments of the present invention can include, for example, a prepaid card 950 and a point-of-sale terminal device 312, e.g., a card reader. As understood by those skilled in the art, a prepaid card can have indicia 952, e.g., logos, slogans, source identifiers, of a sponsoring bank and of a prepaid card processor; a serial number 954; and expiration date 956. The structures of various types of specific cards, e.g., magnetic stripe 958, type of material, are well known to those skilled in the art and can be used with embodiments of the present invention. Typically, a card 950 is formed from plastic and has a magnetic stripe 958 affixed to the plastic through an application of heat. Those skilled in the art will understand that other embodiments besides a magnetic stripe can include radio frequency identification devices (RFID), smart chips, bar codes, and other similar devices. Embodiments of the present invention can include forming cards or receiving cards already formed. The magnetic stripe card 950 can store information, or data, e.g., account information, by modifying the magnetism of particles on the magnetic stripe 958 on the card. The information can be read by swiping the card through a slot 310C past a reading head of a card reader device 312, e.g., point-of-sale hardware. The point-of-sale terminal 312 can include a display 310A and input/output (I/O) devices 310B, e.g., a keypad. Typically, there are two tracks of information on a magnetic card 950 used for financial transactions, known as tracks 1 and 2. In addition, a third track, known as track 3, can be available for magnetic stripe cards. Tracks 1 and 3, if available, are typically recorded at 210 bits per inch, while track 2 typically has a recording density of 75 bits per inch. Track 2, as typically encoded, was developed by the American Bankers Association (ABA) provides for 37 numeric data characters, including up to 19 digits for a primary account number (including a Bank Identification Number as understood by those skilled in the art), an expiration date, a service code, and discretionary verification data, such as, a Personal Identification Number, or PIN. The information, e.g., data, on the card can be used, for example, to facilitate a transaction. For example, when the prepaid card 950 is swiped through a slot 310C, the data on the magnetic stripe 958 is read and processed by the point-of-sale terminal 312, converting data stored in the magnetic particles on the card into data associated with readers 312 and a lending institution computer 307. The point-of-sale terminal 312 can then communicate through an electronic communications network 309 to, for example, a prepaid card processor 315 or a lending institution computer 307. The point-of-sale terminal 312, e.g., card reader, communicates the account information, e.g., data, as read from the card, as well as other data, such as, an amount of a proposed transaction for approval from the merchant computer 313. The other data, for example, can be entered by merchant personnel (e.g., an amount of the transaction), the consumer (e.g., a PIN, or security code), or bank personnel (e.g., a security approval). The prepaid card processor 315 or a lending institution computer 307 can then utilize the account information and other data to authorize or reject a purchase by, for example, determining whether a proposed purchase by the consumer is less than an amount of funds remaining on the card. Moreover, optional security measures, including, for example, a mismatch between a PIN supplied by the consumer and a PIN stored on the card or in a database, can result in the rejection of a proposed transaction. The prepaid card processor 315 or lending institution computer 307 then perform certain functions, including responding to the authorization request so that a point-of-sale displays an indication of approval or rejection, resulting in a visual depiction to a merchant of the approval or rejection of the proposed transaction. Also, prepaid card processor 315 can, for example, write data to a database to record a purchase or other transaction (including advancing a loan from the line of credit), to debit available funds from an account associated with the prepaid card 950, and to credit directly or indirectly a merchant for a purchase. In addition to purchase authorization, embodiments of the present invention also can include customer inquiries into recent transactions or a balance inquiry, i.e., an amount of remaining value associated with the prepaid card.

As illustrated in FIG. 11, embodiments of the present invention include, for example, providing data associated with a prepaid card account as a visual representation of account activity. For example, a customer computer 303, through an Internet Browser 304E, (see FIG. 3) can display on a display 304D an account activity statement 712 for a customer-specific account 713, or set of accounts, with each transaction including, for example, a date 714A, a description 714B, a amount credited to the account 714C, an amount debited from the account 714D, a resulting card balance 714E, a line of credit amount available 714F, and a line of credit outstanding balance 714G, or other such data as understood by those skilled in the art. For example, the visual representation can include a card balance inquiry 715A. For example, the visual representation can include loading the prepaid card with an additional value equal to one or more preselected loan increments so that the prepaid card then has a new amount totaling a previous amount of value on the prepaid card plus the amount of value of the one or more preselected loan increments and so that the new amount exceeds or, alternatively, equals the value of a proposed purchase 715B. For example, the visual representation can include a purchase of goods 715C, wherein data associated with a prepaid card representing an amount of value on the prepaid card is modified in an exchange for products, including goods or services. In addition, the visual representation can include a direct deposit 715D and also a loan repayment from direct deposit funds relatively instantaneously (or prior to) with the direct deposit funds being made available in the consumer's account 715E. In other embodiments, loading the prepaid card 715B and an associated purchase of goods 715C can be represented as a single transaction; likewise, the direct deposit 715D and an associated loan repayment 715E can be represented as a single transaction. In addition, the visual representation can include an increase in a total loan value 715F, i.e., an amount available from the line of credit, responsive to consumer performance data.

As illustrated in FIG. 12, embodiments of the present invention include a computer-implemented method of accessing a line of credit with a prepaid card. The computer-implemented method includes receiving data for a line of credit for a prepaid card from a lending institution computer by a prepaid card processor 253. The data can include, for example, a prequalification status responsive to consumer underwriting data and predetermined qualification parameters, a total loan value, a preselected loan increment, a preselected loan advance fee associated with each preselected loan increment, and a line of credit balance available. The computer-implemented method also includes making available draws to the line of credit line on behalf of the lending institution computer in an authorization stream for a proposed purchase of one or more items using the prepaid card as payment when an amount of value of the proposed purchase of the one or more items is greater than an amount of value on the prepaid card 255. The proposed purchase data can, for example, be received by the lending institution computer or the payroll processor through the electronic communications network and can originate from a card reader device associated with a point of sale terminal. The computer-implemented method further includes loading the prepaid card with an additional value equal to one or more preselected loan increments so that the prepaid card then has a new amount totaling a previous amount of value on the prepaid card plus the amount of value of the one or more preselected loan increments and so that the new amount exceeds or, alternatively, equals the value of a proposed purchase 257 to thereby convert line of credit data into a value associated with the prepaid card to thereby fund the proposed purchase. The computer-implemented method also includes notifying the lending institution of the loading of the prepaid card so that the line of credit balances on the lending institution computer and the prepaid card processor are kept in sync 259.

A person having ordinary skill in the art will recognize that various types of memory are readable by a computer such as described herein, e.g., lending institution, prepaid processor, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the lending institution computer to store program products, e.g., including software, thereon.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

This application is a continuation of and claims priority and the benefit to U.S. patent application Ser. No. 12/417,211, by Ahlers et al., titled "System, Program Product, and Associated Methods to Autodraw for Micro-Credit Attached to a Prepaid Card" filed on Apr. 2, 2009, which claims benefit and priority to U.S. Provisional Patent Application Ser. No. 61/042,612, by Ahlers et al., titled "System, Program Product, and Associated Methods to Autodraw for Micro-Credit Attached to a Prepaid Card" filed on Apr. 4, 2008, each incorporated herein by reference in its entirety. This application also relates to: U.S. Provisional Patent Application Ser. No. 61/016,213, by Sorbe et al., titled "Transfer Account Systems, Computer Program Products, and Associated Methods" filed on Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,624, by Crowe et al., titled "System, Program Product, and Method to Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to: U.S. patent application Ser. No. 12/338,365, by Sorbe et al., titled "Transfer Account Systems, Computer Program Products, and Associated Computer-Implemented Methods" filed on Dec. 18, 2008; U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/389,749, by Sorbe et al., titled "Methods to Advance Loan Proceeds on Prepaid Cards, Associated Systems and Computer Program Products" filed on Feb. 20, 2009; PCT/US09/34692, by Sorbe et al., titled "Methods to Advance Loan Proceeds on Prepaid. Cards, Associated Systems and Computer Program Products" filed on Feb. 20, 2009; U.S. patent application Ser. No. 12/417,211, by Ahlers et al., titled "System, Program Product, and Associated Methods to Autodraw for Micro-Credit Attached to a Prepaid Card" filed on Apr. 2, 2009; U.S. patent application Ser. No. 12/417,182, by Crowe et al., titled "System, Program Product, and Method to Authorize Draw for Retailer Optimization" filed on the Apr. 2, 2009; U.S. patent application Ser. No. 12/338,684, by Ahlers et al., titled "Computer-Implemented Methods, Program Product, and System for Micro-Loan Management" filed on Dec. 18, 2008; PCT/US08/87660 by Ahlers et al., titled "Computer-Implemented Methods, Program Product, and System for Micro-Loan Management" filed on Dec. 19, 2008; U.S. patent application Ser. No. 12/338,712, by Galit et al., titled "Computer-Implemented Methods, Program Product, and System to Enhance Banking Terms Over Time" filed on Dec. 18, 2008; PCT/US08/87689 by Galit et al., titled "Computer-Implemented Methods, Program Product, and System to Enhance Banking Terms Over Time" filed on Dec. 19, 2008; U.S. patent application Ser. No. 12/417,162, by Ahlers et al., titled "System, Program Product, and Method For Debit Card and Checking Account Autodraw" filed on the same day herewith, all of which are each incorporated herein by reference in their entireties.

That is claimed:

1. A prepaid card processor associated with a plurality of prepaid accounts, the prepaid card processor comprising:
one or more central processing units (CPU) configured to process a plurality of transactions associated with the plurality of prepaid card accounts;
one or more input/output units to communicate with one or more remote computers; and
non-transitory computer memory encoded with computer program operable by the one or more CPU so that during operations thereof, the prepaid card processor is configured to perform the following steps:
determining, responsive to a value of a proposed purchase associated with one or more of the plurality of prepaid card accounts being greater than a value associated with the one or more of the plurality of the prepaid card accounts, a number of separate predetermined loan increments to be drawn from a line of credit coupled to the one or more of the plurality of prepaid card accounts, the number of separate predetermined loan increments multiplied by a value of one of the plurality of separate predetermined loan increments plus the value associated with one or more of the plurality of prepaid card accounts exceeding the value of the proposed purchase by less than the value of one of the plurality of separate predetermined loan increments;
loading the one or more of the plurality of prepaid card accounts with draws from the line of credit in the number of separate predetermined loan increments to thereby define loaded predetermined increments responsive to receiving the draws from the line of credit; and
deducting the value of the proposed purchase from the value associated with the one or more of the plurality of the prepaid card accounts, the difference between the value of the proposed purchase and the value associated with the one or more of the plurality of prepaid card accounts being no greater than the value of one of the plurality of separate predetermined loan increments, each of the plurality of separate predetermined loan increments being equal in value.

2. A prepaid card processor as defined in claim 1, the prepaid card processor further configured to perform the step of:
deducting at least a first portion of a line of credit balance from one or more automatic deposits to thereby repay at least a portion of the line of credit balance associated with the loaded predetermined increments responsive to receiving the one or more automatic deposits.

3. A prepaid card processor as defined in claim 2, wherein one or more of the one or more remote computers are computers associated with one or more lending institutions associated with the line of credit to define one or more lending institution computers; and wherein the prepaid card processor further configured to perform the steps of:
transmitting via a communication network at least a second portion of the first portion of the line of credit balance deducted from the one or more automatic deposits to the one or more lending institution computers so that the one or more lending institution computers is adapted to reduce the line of credit balance associated with the loaded predetermined increments; and
synchronizing line of credit data stored on the non-transitory memory of the prepaid card processor with line of credit data stored with the one or more lending institution computers.

4. A prepaid card processor as defined in claim 3, wherein the second portion of the one or more automatic deposits transmitted to the one or more lending institution computers is the first portion deducted from the one or more automatic deposits minus a fee for the prepaid card processor.

5. A prepaid card processor as defined in claim 1, wherein line of credit data further includes a preauthorized individual loan limit, and wherein loading of the one or more of the plurality of prepaid accounts is responsive to the predetermined loan increments not exceeding the preauthorized individual loan limit.

6. A prepaid card processor as defined in claim 1, wherein a total value of a predetermined loan advance fee being equal to a predetermined loan advance fee multiplied by the number of separate predetermined loan increments; and wherein the total value of the predetermined loan advance fee being less than the value of one of the loaded predetermined increments.

7. A prepaid card processor as defined in claim 2, wherein the deduction is made prior to the one or more automatic deposit being available for use in the one or more of the plurality of prepaid card accounts.

8. Non-transitory computer memory encoded with computer program executable by a prepaid card processor, the computer program comprising instructions that, when executed by the prepaid card processor causes the prepaid card processor to perform the operations of:
determining, responsive to a value of a proposed purchase being greater that a value associated with one or more of a plurality of prepaid card accounts, a number of separate predetermined loan increments to be drawn from a line of credit coupled to the one or more of the plurality of prepaid card accounts, the number of separate predetermined loan increments multiplied by a value of one of the plurality of separate predetermined loan increments plus the value associated with one or more of the plurality of prepaid card accounts exceeding the value of the proposed purchase by less than the value of one of the plurality of separate predetermined loan increments;

loading the one or more of the plurality of the prepaid card accounts with draws from the line of credit in the number of separate predetermined loan increments to thereby define loaded predetermined increments responsive to receiving the draws from the line of credit; and deducting the value of the proposed purchase from the value associated with the one or more of the plurality of the prepaid card accounts, the difference between the value of the proposed purchase and the value associated with the one or more of the plurality of prepaid card accounts being no greater than the value of one of the plurality of separate predetermined loan increments, each of the plurality of separate predetermined loan increments being equal in value.

9. Non-transitory memory as defined in claim 8, wherein the computer program further comprising instructions that, when executed by the prepaid card processor causes the prepaid card processor to perform the operation of:

deducting at least a first portion of a line of credit balance from one or more automatic deposits to thereby repay at least a portion of the line of credit balance associated with the loaded predetermined increments responsive to receiving the one or more automatic deposits.

10. Non-transitory memory as defined in claim 9, wherein the computer program further comprising instructions that, when executed by the prepaid card processor causes the prepaid card processor to perform the operation of:

communicating with one or more remote computers associated with one or more lending institutions associated with the line of credit to define one or more lending institution computers;

transmitting via a communication network at least a second portion of the first portion of the line of credit balance deducted from the one or more automatic deposits to the one or more lending institution computers so that the one or more lending institution computers is adapted to reduce the line of credit balance associated with the loaded predetermined increments; and synchronizing line of credit data stored on a non-transitory memory of the prepaid card processor with line of credit data stored with the one or more lending institution computers.

11. Non-transitory memory as defined in claim 10, wherein the second portion of the one or more automatic deposits transmitted to the one or more lending institution computers is the first portion deducted from the one or more automatic deposits minus a fee for the prepaid card processor.

12. Non-transitory memory as defined in claim 10, wherein the line of credit data further includes a preauthorized individual loan limit, and wherein loading of the one or more of the plurality of prepaid accounts is responsive to the predetermined loan increments not exceeding the preauthorized individual loan limit.

13. Non-transitory memory as defined in claim 8, wherein a total value of a predetermined loan advance fee being equal to a predetermined loan advance fee multiplied by the number of separate predetermined loan increments; and wherein the total value of the predetermined loan advance fee being less than the value of one of the loaded predetermined increments.

14. Non-transitory memory as defined in claim 9, wherein the deduction is made prior to the one or more automatic deposit being available for use in the one or more of the plurality of prepaid card accounts.

15. A computer-implemented method to allow draws from a line of credit in one or more of a plurality of separate predetermined loan increments, the computer-implemented method comprising:

determining, by a prepaid card processor configured to process a plurality of transactions associated with a plurality of prepaid card accounts, a number of separate predetermined loan increments to be drawn from a line of credit coupled to one or more of the plurality of prepaid card accounts, the number of separate predetermined loan increments multiplied by a value of one of the plurality of separate predetermined loan increments plus a value associated with one or more of the plurality of prepaid card accounts exceeding a value of a proposed purchase by less than the value of one of the plurality of separate predetermined loan increments, the determination being responsive to the value of the proposed purchase being greater than the value associated with the one or more of the plurality of the prepaid card accounts;

loading, by the prepaid card processor, the one or more of the plurality of the prepaid card accounts with draws from the line of credit in the number of separate predetermined loan increments to thereby define loaded predetermined increments responsive to receiving the draws from the line of credit; and deducting, by the prepaid card processor, the value of the proposed purchase from the value associated with the one or more of the plurality of the prepaid card accounts, the difference between the value of the proposed purchase and the value associated with the one or more of the plurality of prepaid card accounts being no greater than the value of one of the plurality of separate predetermined loan increments, each of the plurality of separate predetermined loan increments being equal in value.

16. A computer-implemented method as defined in claim 15, the computer-implemented method further comprising: communicating, via a communication network, the number of separate predetermined loan increments determined by the prepaid card processor to a lending institution computer associated with the line of credit to thereby request draws from the line of credit.

17. A computer-implemented method as defined in claim 15, the computer-implemented method further comprising: deducting, by the prepaid card processor, at least a first portion of a line of credit balance from one or more automatic deposits to thereby repay at least a portion of the line of credit balance associated with the loaded predetermined increments responsive to receiving the one or more automatic deposits.

18. A computer-implemented method as defined in claim 17, the computer-implemented method further comprising: deducting a second portion from the first portion of the line of credit balance deducted from the one or more automatic deposits, the second portion being equal to the first portion deducted from the one or more automatic deposits minus a fee for the prepaid card processor.

19. A computer-implemented method as defined in claim 15, wherein the line of credit includes a preauthorized individual loan limit, and wherein loading of the one or more of the plurality of prepaid accounts is responsive to the predetermined loan increments not exceeding the preauthorized individual loan limit.

20. A computer-implemented method as defined in claim 15, wherein a total value of a predetermined loan advance fee being equal to a predetermined loan advance fee multiplied by the number of separate predetermined loan increments; and wherein the total value of the predetermined loan advance fee being less than the value of one of the loaded predetermined increments.

* * * * *